US012490769B2

(12) United States Patent
Li et al.

(10) Patent No.: US 12,490,769 B2
(45) Date of Patent: Dec. 9, 2025

(54) ATOMIZING DEVICE

(71) Applicant: LUXSHARE PRECISION INDUSTRY COMPANY LIMITED, Shenzhen (CN)

(72) Inventors: HuaBing Li, Shenzhen (CN); ZhongYuan Lai, Shenzhen (CN); Yu Huang, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 708 days.

(21) Appl. No.: 17/881,392

(22) Filed: Aug. 4, 2022

(65) Prior Publication Data

US 2023/0044795 A1 Feb. 9, 2023

(30) Foreign Application Priority Data

Aug. 6, 2021 (CN) ........................ 202121838820.X

(51) Int. Cl.
*A24F 40/05* (2020.01)
*A24F 40/10* (2020.01)
(Continued)

(52) U.S. Cl.
CPC .............. *A24F 40/05* (2020.01); *A24F 40/10* (2020.01); *A24F 40/42* (2020.01); *A24F 40/46* (2020.01);
(Continued)

(58) Field of Classification Search
CPC ........ A24F 40/485; A24F 40/05; A24F 40/10; A24F 40/46; H01F 7/081; H01F 7/1615
See application file for complete search history.

(56) References Cited

U.S. PATENT DOCUMENTS 4,044,077 A 8/1977 Gupta
2004/0089743 A1 5/2004 Tilton et al.
(Continued)

FOREIGN PATENT DOCUMENTS

CN 204335830 U 5/2015
CN 105192891 A 12/2015
(Continued)

OTHER PUBLICATIONS

Zheng, "Liquid Sprayer (4)," Pharmaceutical Design, 1982, 12 pages total, with an English abstract.
(Continued)

*Primary Examiner* — Thien S Tran
(74) *Attorney, Agent, or Firm* — Birch, Stewart, Kolasch & Birch, LLP

(57) ABSTRACT

The present disclosure provides an atomizing device including an atomizing component, a controlling component, and a battery component. The atomizing component includes an atomizing piece, an accommodating piece, a piston, and an induction coil. The accommodating piece is disposed on the atomizing piece. Wherein, the accommodating piece is in fluid communication with the atomizing piece, and the accommodating piece is configured to store a filler. The piston is disposed in the accommodating piece and has a magnet inside. The induction coil surrounds the accommodating piece, and the induction coil is configured to drive the piston to move toward the atomizing piece. The controlling component is disposed on one side of the atomizing component is electrically connected to the atomizing component. The battery component is disposed on one side of the controlling component away from the atomizing component and is electrically connected to the controlling component.

17 Claims, 22 Drawing Sheets

(51) Int. Cl.

| | |
|---|---|
| ***A24F 40/42*** | (2020.01) |
| ***A24F 40/46*** | (2020.01) |
| ***A24F 40/485*** | (2020.01) |
| ***A24F 40/51*** | (2020.01) |
| ***H01F 7/08*** | (2006.01) |

(52) U.S. Cl.

CPC ............ *A24F 40/485* (2020.01); *A24F 40/51* (2020.01); *H01F 7/081* (2013.01); *H01F 2007/086* (2013.01)

(56) References Cited

U.S. PATENT DOCUMENTS

| | | | | |
|---|---|---|---|---|
| 2006/0196518 | A1* | 9/2006 | Hon | A24B 15/167 131/347 |
| 2015/0181938 | A1 | 7/2015 | Metrangolo et al. | |
| 2015/0181944 | A1 | 7/2015 | Li et al. | |
| 2015/0216237 | A1* | 8/2015 | Wensley | A24F 40/48 131/273 |
| 2015/0272217 | A1 | 10/2015 | Chen | |
| 2017/0208866 | A1 | 7/2017 | Liu | |
| 2017/0280774 | A1 | 10/2017 | Force | |
| 2017/0354186 | A1 | 12/2017 | Johnson et al. | |
| 2018/0077968 | A1 | 3/2018 | Qiu | |
| 2018/0125118 | A1* | 5/2018 | Chen | H05B 3/44 |
| 2018/0279675 | A1 | 10/2018 | Liu | |
| 2018/0338529 | A1 | 11/2018 | Weigensberg et al. | |
| 2019/0037926 | A1 | 2/2019 | Qiu | |
| 2019/0099561 | A1 | 4/2019 | Nettenstrom | |
| 2019/0124982 | A1 | 5/2019 | Atkins et al. | |
| 2020/0003741 | A1 | 1/2020 | Buck et al. | |
| 2020/0015523 | A1 | 1/2020 | Ouyang | |
| 2020/0037670 | A1 | 2/2020 | Fenner, Jr. et al. | |
| 2020/0214357 | A1 | 7/2020 | Holzherr et al. | |
| 2020/0288788 | A1 | 9/2020 | Vora et al. | |
| 2020/0297033 | A1 | 9/2020 | Wang et al. | |
| 2021/0235757 | A1 | 8/2021 | Yamada et al. | |
| 2022/0022536 | A1 | 1/2022 | Saygili | |
| 2022/0400761 | A1 | 12/2022 | Tang et al. | |
| 2023/0087448 | A1 | 3/2023 | He et al. | |
| 2023/0180850 | A1 | 6/2023 | Yilmaz et al. | |

FOREIGN PATENT DOCUMENTS

| | | | | | |
|---|---|---|---|---|---|
| CN | 208173714 | U | | 11/2018 | |
| CN | 209768990 | U | | 12/2019 | |
| CN | 111657550 | A | | 9/2020 | |
| CN | 112841728 | A | | 5/2021 | |
| EP | 3229619 | B1 | * | 6/2019 | H05B 3/44 |
| EP | 4 047 952 | A1 | | 8/2022 | |
| JP | 6525228 | B1 | | 6/2019 | |
| JP | 6550671 | B1 | | 7/2019 | |
| KR | 20200109782 | A | * | 9/2020 | H05B 6/36 |
| RU | 2 359 153 | C1 | | 6/2009 | |
| TW | 201900044 | A | | 1/2019 | |
| TW | 202011842 | A | | 4/2020 | |
| WO | WO-2015037925 | A1 | * | 3/2015 | A61M 15/06 |
| WO | WO 2016/109965 | A1 | | 7/2016 | |
| WO | WO 2016/165055 | A1 | | 10/2016 | |
| WO | WO 2018/223290 | A1 | | 12/2018 | |
| WO | WO-2021073045 | A1 | * | 4/2021 | H05K 1/111 |

OTHER PUBLICATIONS

U.S. Office Action for U.S. Appl. No. 17/880,807, dated Jul. 28, 2025.

U.S. Office Action for U.S. Appl. No. 17/880,812, dated Jul. 7, 2025.

* cited by examiner

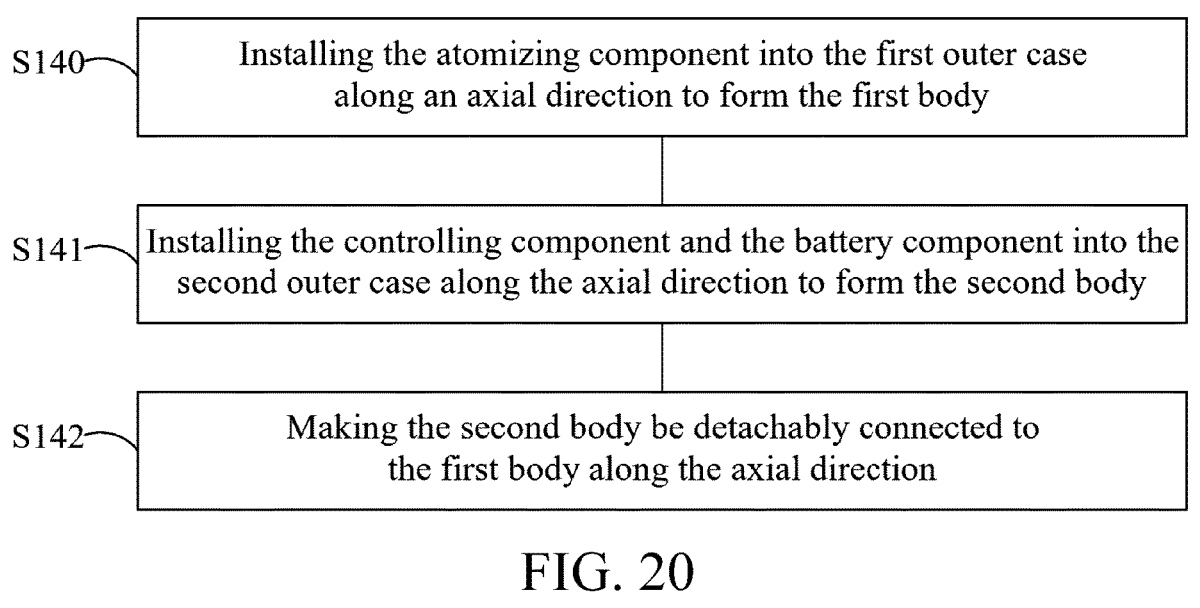

S140 — Installing the atomizing component into the first outer case along an axial direction to form the first body S141 — Installing the controlling component and the battery component into the second outer case along the axial direction to form the second body S142 — Making the second body be detachably connected to the first body along the axial direction

FIG. 20

ATOMIZING DEVICE

CROSS REFERENCE TO RELATED DISCLOSURE

This application claims the priority benefit of China Patent Application Number 202121838820.X, filed on Aug. 6, 2021, the full disclosure of which is incorporated herein by reference.

BACKGROUND

Technical Field

The present disclosure is related to an atomizing equipment, and in particular, an atomizing device having a specific atomizing component.

Related Art

In the prior art, atomizing equipment is used to atomize specific fillers for use by users. For example, the atomizing equipment may be an electronic cigarette. An electronic cigarette is an electronic device that simulates a traditional cigarette. The electronic cigarette is composed of an atomizer, a silo, and a battery. With the power provided by the battery, the atomizer can atomize the filler in the silo to simulate the smoke of traditional cigarettes. However, the atomizer in the prior art generally heats the filler through a heating coil and supplements the filler to be heated through an oil-conducting cotton. That is, the atomizing equipment in the prior art only performs atomizing through simple physical methods, and the size and concentration of the atomized filler are both unstable. Therefore, how to provide an atomizing device that can generate smoke with stable size and stable concentration has become an urgent issue in this field.

SUMMARY

The embodiments of the present disclosure disclose an atomizing device, in order to solve the problem that the atomizing device in the prior art can only generate smoke with unstable size and concentration.

In order to solve the above technical problems, the present disclosure is implemented as follows.

An atomizing device is provided, and atomizing device includes an atomizing component, a controlling component, and a battery component. The atomizing component includes an atomizing piece, an accommodating piece, a piston, and an induction coil. The accommodating piece is disposed on the atomizing piece. Wherein, the accommodating piece is in fluid communication with the atomizing piece, and the accommodating piece is configured to store a filler. The piston is disposed in the accommodating piece, and the piston has a magnet inside. The induction coil surrounds the accommodating piece, and the induction coil is configured to drive the piston to move toward the atomizing piece. The controlling component is disposed on one side of the atomizing component, and the controlling component is electrically connected to the atomizing component. The battery component is disposed on one side of the controlling component away from the atomizing component, and the battery component is electrically connected to the controlling component.

In some embodiments, the atomizing piece has a plurality of atomizing holes on the surface, and the accommodating piece is in fluid communication with the plurality of atomizing holes.

In some embodiments, the diameter of the plurality of atomizing holes is within 1 um to 5 um.

In some embodiments, the atomizing component further comprises a transmission wire, a first electrical connector, and a second electrical connector. One end of the transmission wire is electrically connected to the atomizing piece. The first electrical connector is electrically connected to the other end of the transmission wire. The second electrical connector is disposed on one side of the induction coil, wherein the second electrical connector is electrically connected to the induction coil.

In some embodiments, the atomizing component further comprises a pressure sensor. The pressure sensor is disposed in the accommodating piece, and the pressure sensor is electrically connected to the controlling component.

In some embodiments, the atomizing component further comprises a heater, and the heater is disposed on one side of the atomizing piece.

In some embodiments, an outer wall of the piston is disposed with a plurality of limiting protrusions, and the plurality of limiting protrusions is in contact with an inner surface of the accommodating piece.

In some embodiments, a filling port is disposed on the accommodating piece, and silicone is disposed on the filling port.

In some embodiments, the atomizing piece is a piezoelectric ceramic.

In some embodiments, the piston is formed by coating a permanent magnet with silicone.

In the present disclosure, the piston is driven to move by the induction coil surrounding the accommodating piece, so that the filler may be atomized by stably passing through the atomizing piece. In other words, the entire atomizing process is controlled by stable and fine electricity, so the size thereof is uniform and the concentration thereof is stable. That is, the present disclosure realizes an atomizing device that can generate smoke of stable size and stable concentration.

BRIEF DESCRIPTION OF THE DRAWINGS

The figures described herein are used to provide a further understanding of the present disclosure and constitute a part of the present disclosure. The exemplary embodiments and descriptions of the present disclosure are used to illustrate the present disclosure and do not limit the present disclosure, in which:

FIG. 20 is another flowchart of the assembling method of the atomizing device of an embodiment of the present disclosure;

DETAILED DESCRIPTION OF THE EMBODIMENTS

In order to make the objectives, technical solutions, and advantages of the present disclosure clearer, the technical solutions of the present disclosure will be described clearly and completely in conjunction with specific embodiments and the figures of the present disclosure. Obviously, the described embodiments are only a part of the embodiments of the present disclosure, rather than all the embodiments. Based on the embodiments in the present disclosure, all other embodiments obtained by a person having ordinary skills in the art without creative work fall within the protection scope of this disclosure.

The following description is of the best-contemplated mode of carrying out the present disclosure. This description is made for the purpose of illustrating the general principles of the present disclosure and should not be taken in a limiting sense. The scope of the present disclosure is best determined by reference to the appended claims.

Figure 1:
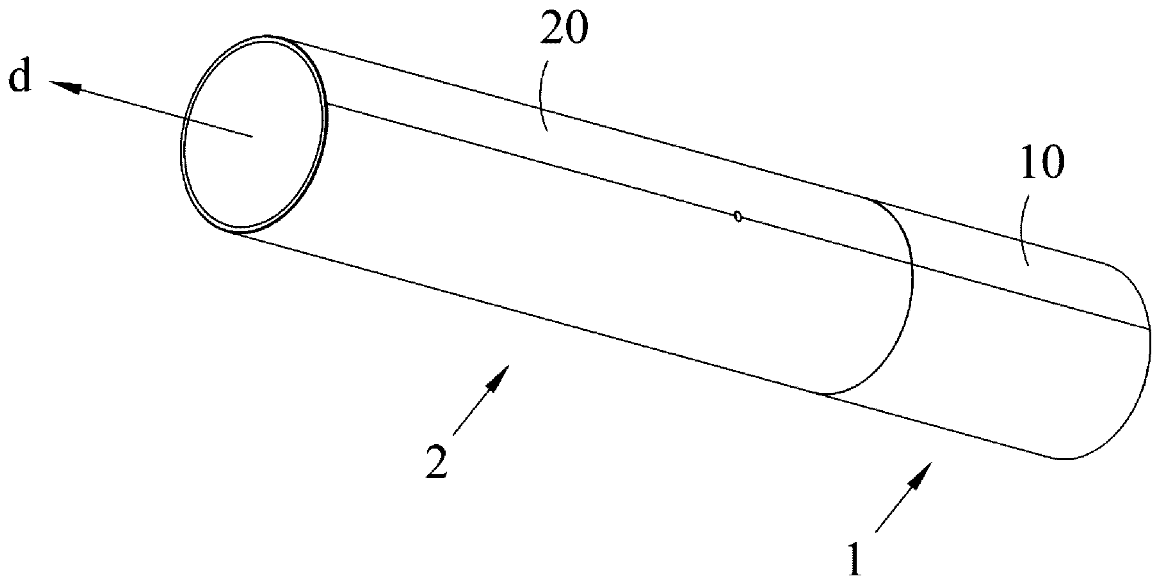
FIG. 1 is a schematic diagram of the atomizing device of an embodiment of the present disclosure.
Figure 2:
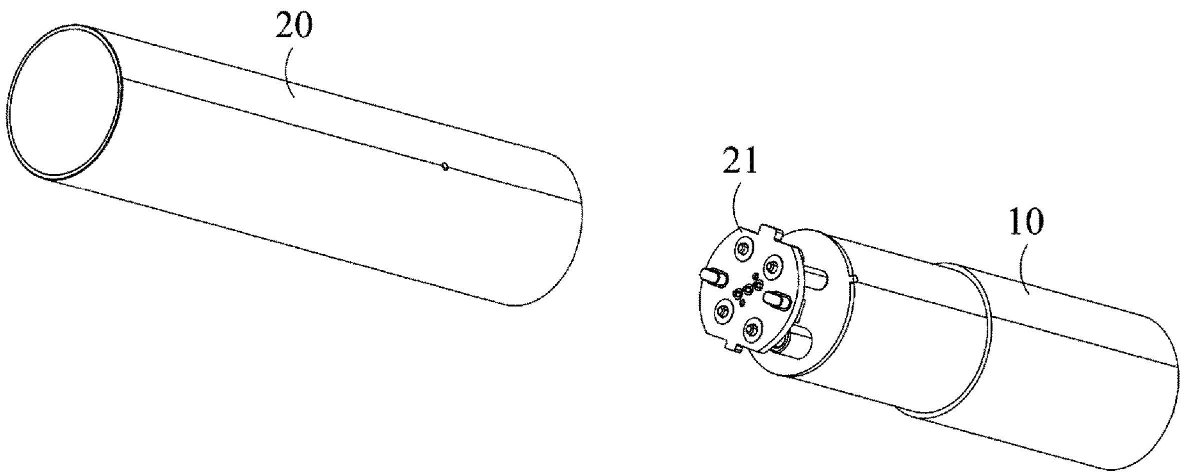
FIG. 2 is an exploded view of the atomizing device of an embodiment of the present disclosure.
Figure 3:
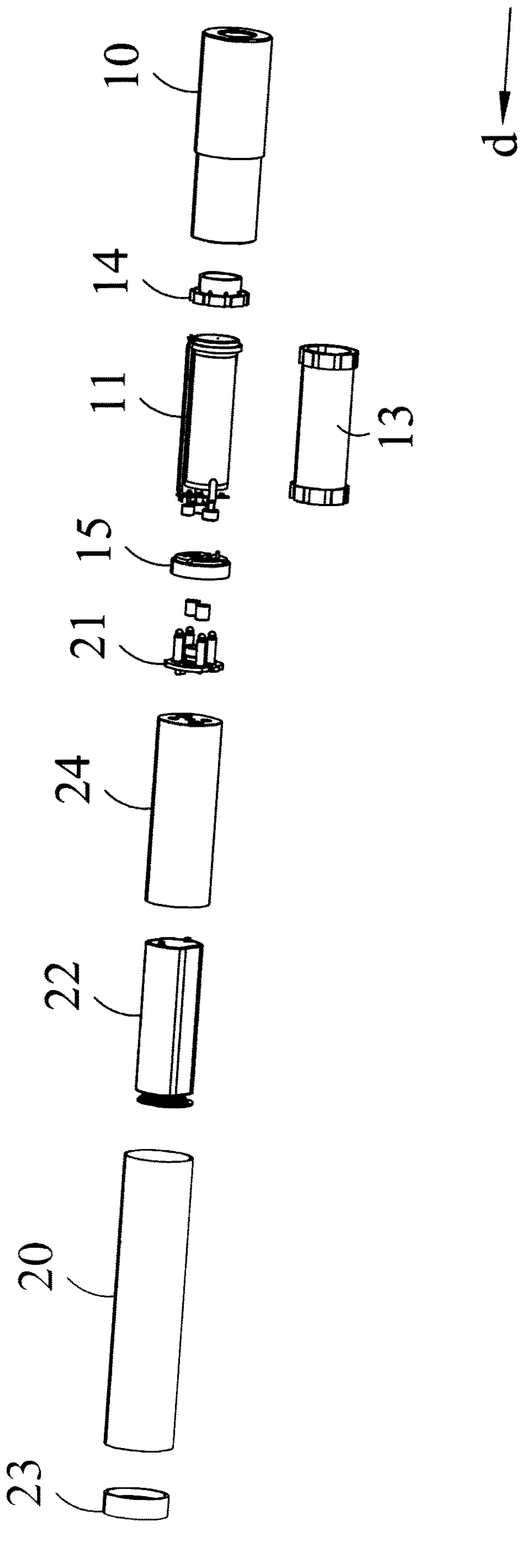
FIG. 3 is another exploded view of the atomizing device of an embodiment of the present disclosure.

FIG. 1 to FIG. 3 are a schematic diagram, an exploded view, and another exploded view of the atomizing device of an embodiment of the present disclosure, respectively. The atomizing device includes a first body 1 and a second body 2. The first body 1 includes a first outer case 10 and an atomizing component 11. The atomizing component 11 is disposed in the first outer case 10. The second body 2 is detachably connected to the first body 1, wherein the second body 2 includes a second outer case 20, a controlling component 21, and a battery component 22. The controlling component 21 is disposed on one side of the second outer case 20 close to the atomizing component 11, wherein the controlling component 21 is electrically connected to the atomizing component 11. The battery component 22 is disposed on one side of the second outer case 20 away from the atomizing component 11, wherein the battery component 22 is electrically connected to the controlling component 21.

More specifically, an inner cavity of the first outer case 10 and an inner cavity of the second outer case 20 are communicated with each other along an axial direction d. The atomizing component 11 is configured to be installed into the first outer case 10 along the axial direction d to form the first body 1. The controlling component 21 and the battery component 22 are configured to be installed into the second outer case 20 along the axial direction d to form the second body 2. The second body 2 is detachably connected to the first body 1 along the axial direction d. With the above configuration, the present disclosure solves the problem of the complicated structure of the atomizing device in the prior art, thereby realizing an atomizing device with a simple structure and easy assembly and maintenance. In order to make the present disclosure clearer and easier to understand, the components of the atomizing device and their interactions will be explained in detail hereinafter.

Figure 4:
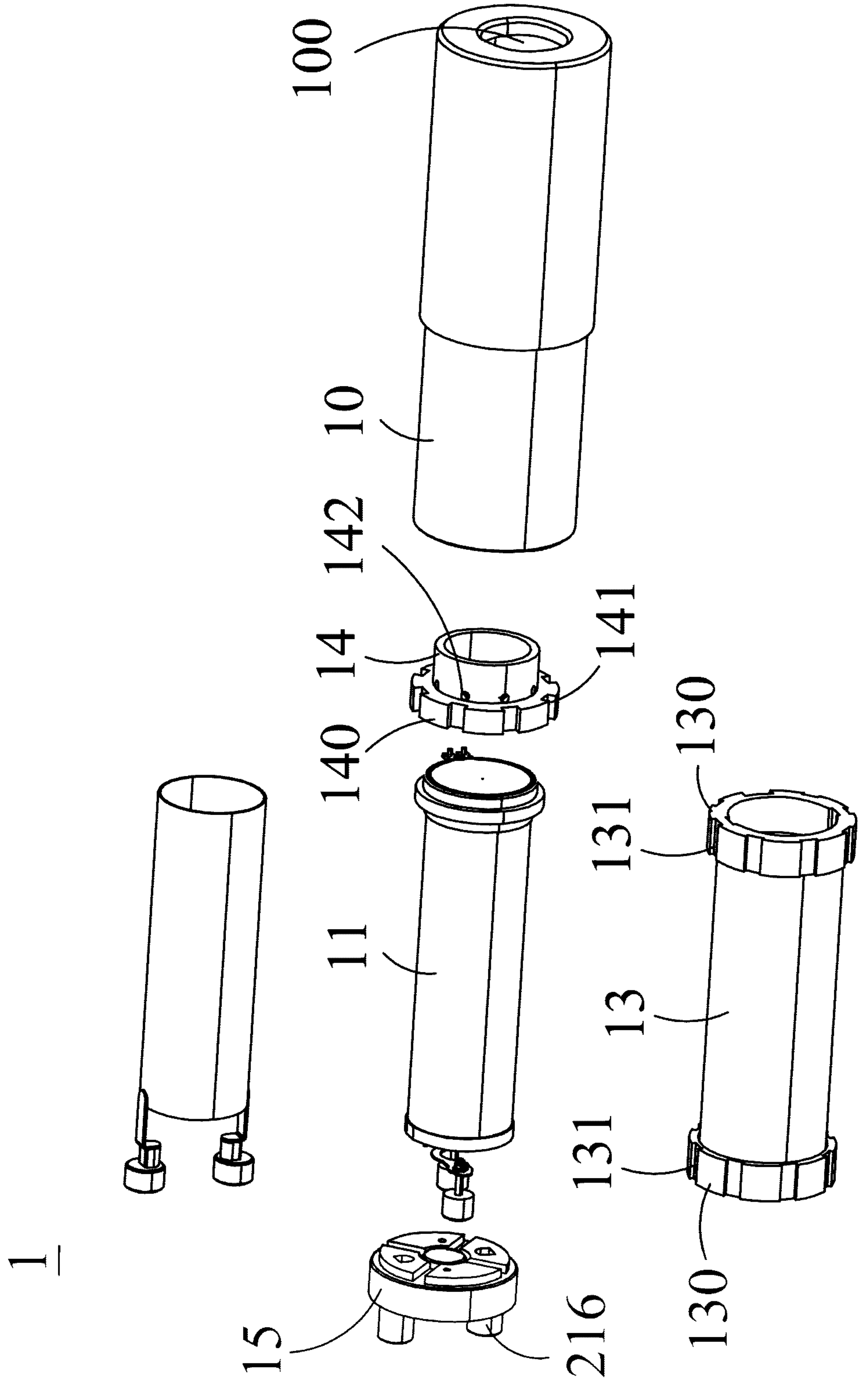
FIG. 4 is an exploded view of the first body of an embodiment of the present disclosure.

FIG. 4 is an exploded view of the first body of an embodiment of the present disclosure. As shown in the figure, in some embodiments, the first outer case 10 may be a hollow cylinder with openings at both ends, and the first outer case 10 covers the atomizing component 11. More specifically, one end of the first outer case 10 corresponds to the second outer case 20, and the other end of the first outer case 10 and the atomizing component 11 jointly form an air outlet 100 of the atomizing device. Wherein, the air outlet 100 is in fluid communication with the atomizing component 11.

Figure 5:
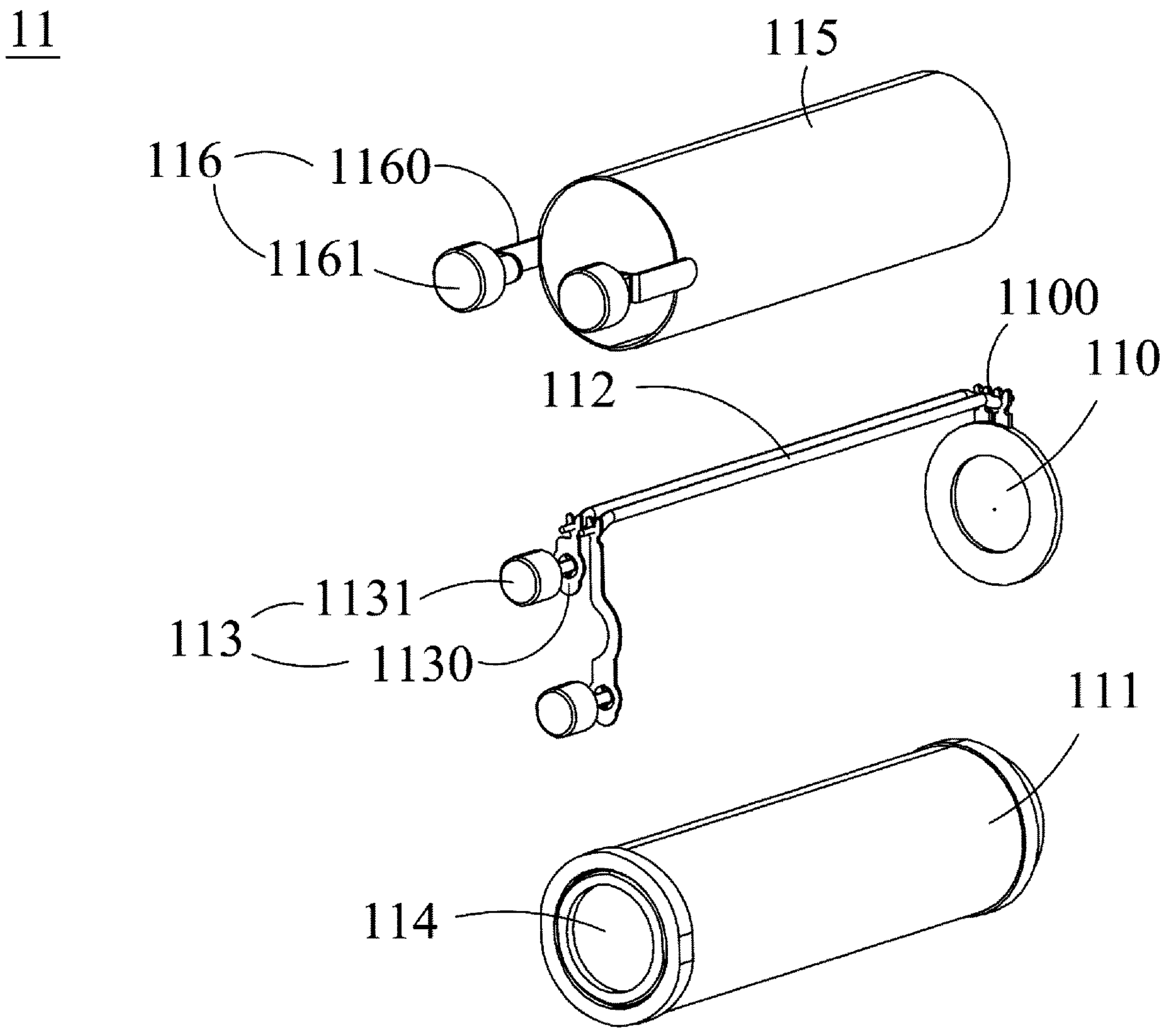
FIG. 5 is an exploded view of the atomizing component of an embodiment of the present disclosure.
Figure 6:
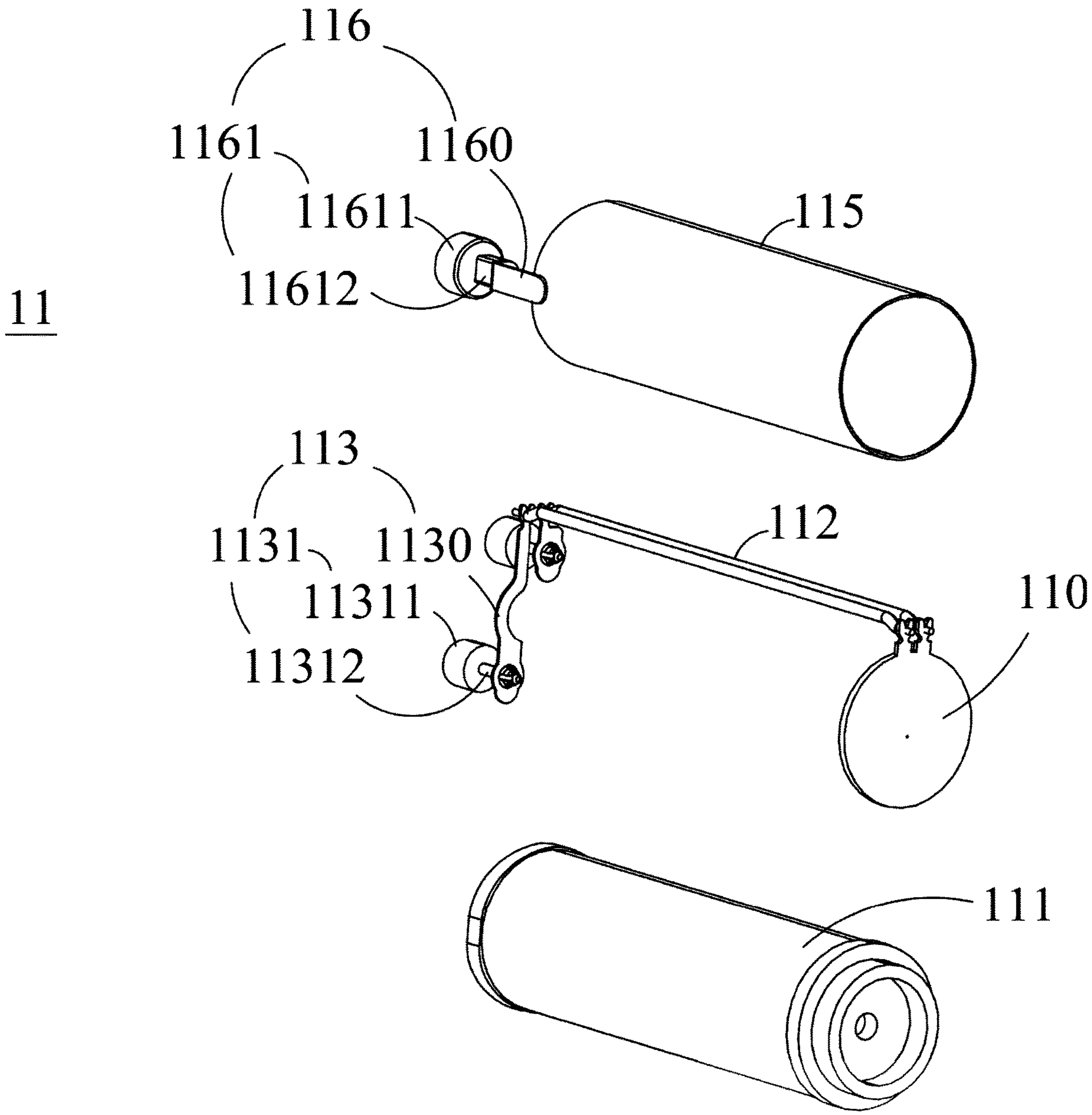
FIG. 6 is another exploded view of the atomizing component of an embodiment of the present disclosure.

FIG. 5 and FIG. 6 are an exploded view and another exploded view of the atomizing component of an embodiment of the present disclosure, respectively. As shown in the figure, in some embodiments, the atomizing component 11 may include an atomizing piece 110, an accommodating piece 111, a piston 114, and an induction coil 115. The accommodating piece 111 is disposed on the atomizing piece 110, wherein the accommodating piece 111 is in fluid communication with the atomizing piece 110, and the accommodating piece 111 is configured to store a filler. The piston 114 is disposed in the accommodating piece 111, and the piston 114 has a magnet inside. The induction coil 115 surrounds the accommodating piece 111, wherein the induction coil 115 is configured to drive the piston 114 to move toward the atomizing piece 110.

In some embodiments, the atomizing component 11 may further include a transmission wire 112, a first electrical connector 113, and a second electrical connector 116. One end of the transmission wire 112 is electrically connected to the atomizing piece 110. The first electrical connector 113 is electrically connected to the other end of the transmission wire 112 and receives power from the battery component 22. The second electrical connector 116 is disposed on one side of the induction coil 115, and the second electrical connector 116 is electrically connected to the induction coil 115.

In some embodiments, the atomizing piece 110 may have a plurality of atomizing holes on the surface, and the accommodating piece 111 is in fluid communication with the plurality of atomizing holes. For example, the atomizing piece 110 may be a piezoelectric ceramic, and the surface of the piezoelectric ceramic has a plurality of micron-level holes (ie, atomizing holes). Piezoelectric ceramics may be controlled by voltage and current to generate vibration. By the vibration of the atomizing piece 110, the filler passing through the atomizing hole may be atomized better. That is, the atomizing piece 110 may atomize the filler at a relatively low temperature to make the application of the atomizing device more diverse. However, the present disclosure is not limited thereto. In some embodiments, the atomizing piece 110 may also include a heating coil, and the heating coil atomizes the filler by heating. In some embodiments, the atomizing piece 110 includes both piezoelectric ceramics and heating coils.

Taking the atomizing piece 110 as a piezoelectric ceramic with the plurality of atomizing holes as an example, the operation process is: the power provided by the battery component 22 is transmitted to the atomizing piece 110 through the first electrical connector 113 and the transmission wire 112, so that the atomizing piece 110 vibrates. Then, the filler in the accommodating piece 111 becomes tiny particles when passing through the plurality of atomizing holes on the atomizing piece 110 which is vibrating. On the other hand, the power provided by the battery component 22 is transmitted to the induction coil 115 through the second electrical connector 116, so that the induction coil 115 generates a magnetic field. Then, the magnet in the piston 114 in the accommodating piece 111 is driven by the magnetic field to squeeze the filler and move the filler in the direction of the atomizing piece 110. In this way, the atomizing component 11 may automatically push the filler, and the filler may atomize by the vibrating atomizing piece 110. Furthermore, since the entire atomizing process is controlled by stable and fine electricity, the size of the atomized filler is uniform and the concentration of the atomized filler is stable.

In some embodiments, the diameter of the plurality of atomizing holes may be 1 um to 5 um. For example, the diameter of the plurality of atomizing holes may be 1 um, 2 um, 3 um, 4 um, 5 um, or any range composed of the values mentioned above. Preferably, the diameter of the plurality of atomizing holes is 3 um. Specifically, the size of the atomized filler may vary according to the diameter of the plurality of atomizing holes. When the diameter of the atomizing holes is greater than 5 um, the size of the atomized filler is too large, resulting in a poor atomizing effect. Conversely, when the diameter of the atomizing holes is less than 1 um, the filler cannot easily pass through the plurality of atomizing holes, resulting in a decrease in atomizing efficiency.

In some embodiments, the atomizing piece 110 may further include at least one gas-permeable film. At least one gas-permeable membrane is disposed on one side of the piezoelectric ceramic away from the accommodating piece 111, and at least one gas-permeable film has a plurality of holes smaller in size than the holes of the piezoelectric ceramic. By arranging the gas-permeable films with different holes sizes from the greatest to the latest, the filler may be gradually refined during the atomizing process.

In some embodiments, a U-shaped groove 1100 may be disposed on one side of the atomizing piece 110, and the transmission wire 112 is crimped on the U-shaped groove 1100 to be electrically connected to the atomizing piece 110. However, the present disclosure is not limited thereto. In other embodiments, the transmission wire 112 may also be bonded, welded, snapped, or directly wound, and other methods known by a person having ordinary skills in the art to be electrically connected to the atomizing piece 110.

In some embodiments, a filling port (not shown in the figure) may be disposed on the accommodating piece 111, and silicone may be disposed on the filling port. When a filling port is disposed, the user may inject the filler into the accommodating piece 111 through a syringe or the like. Furthermore, the silicone on the filling port spontaneously fills up the gap generated by the needle insertion when the syringe is pulled out, so as to prevent filler exudation from the filler port. It should be noted that the present disclosure is not limited to the use of silicone as the sealing film. Any material known by a person having ordinary skills in the art may be applied to the function of preventing filler exudation.

Figure 7:
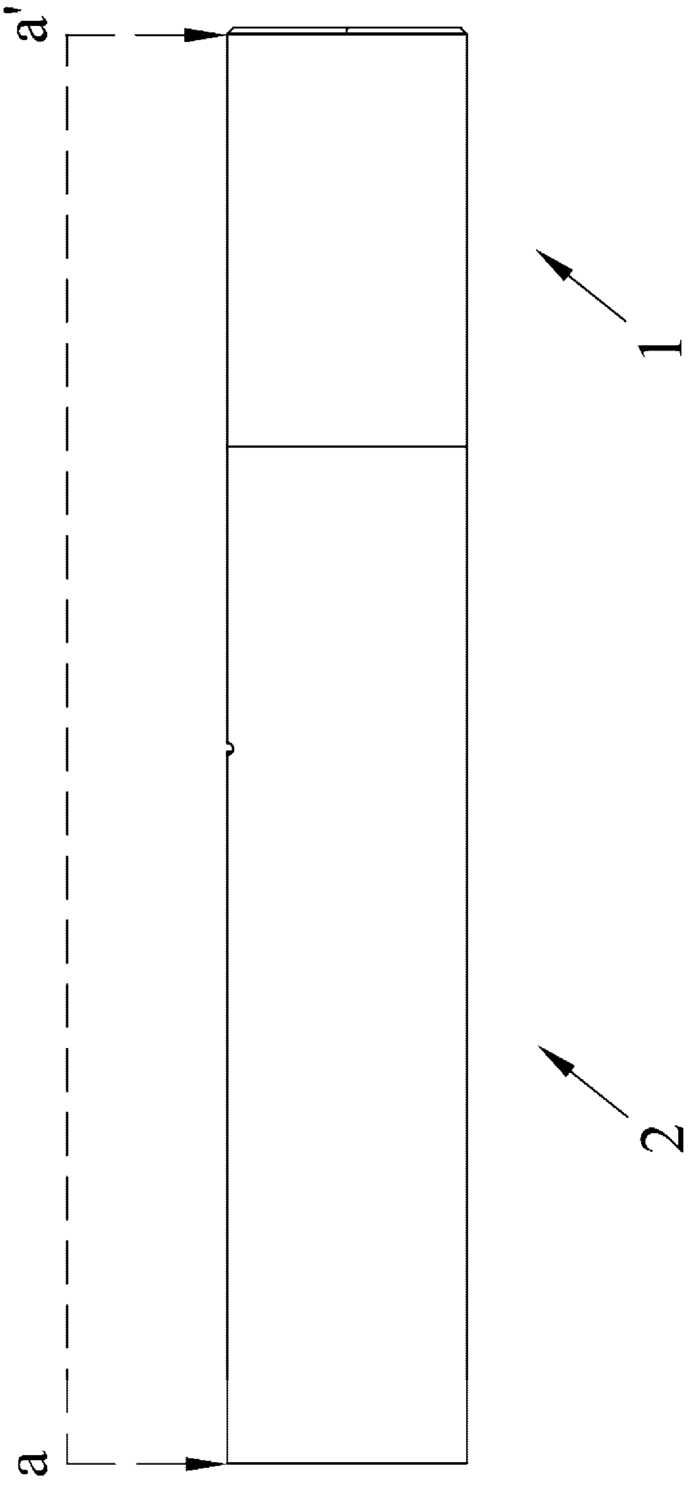
FIG. 7 is a side view of the atomizing device of an embodiment of the present disclosure.
Figure 8:
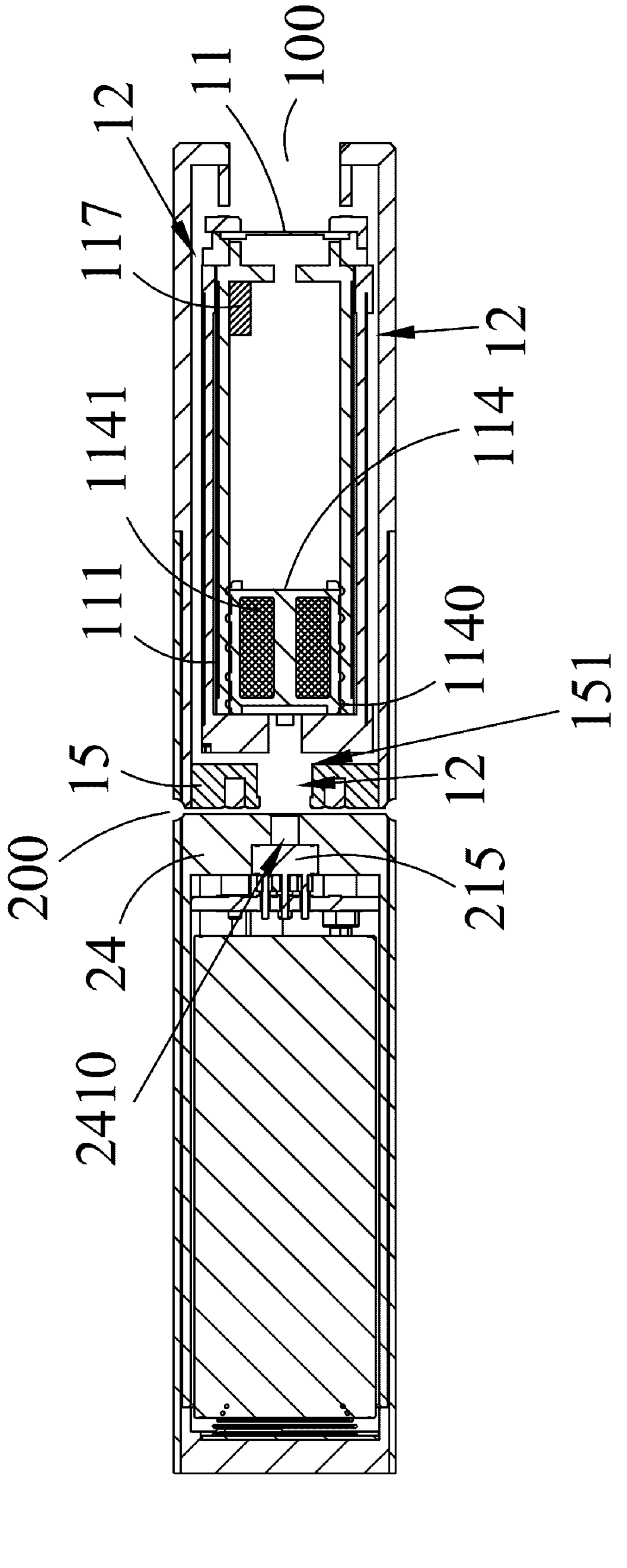
FIG. 8 is a cross-sectional view taken along the line a-a' in FIG. 7.

FIG. 7 and FIG. 8 respectively are a side view of an atomizing device of an embodiment of the present disclosure and a cross-sectional view along the line a-a' in FIG. 7. As shown in the figure, in some embodiments, the inner wall of the accommodating piece 111 is a smooth surface, and the outer wall of the piston 114 may be disposed with a plurality of limiting protrusions 1140. The plurality of limiting protrusions 1140 are in contact with the surface of the inner wall of the accommodating piece 111. With the plurality of limiting protrusions 1140, the piston 114 may be prevented from sliding out of the side of the accommodating piece 111 away from the atomizing piece 110. In addition, the abnormal noise generated by the piston 114 moving in the accommodating piece 111 may be reduced. However, the present disclosure is not limited thereto. In some embodiments, the inner wall of the accommodating piece 111 away from the atomizing piece 110 may be disposed with a plurality of limiting grooves, and the limiting grooves correspond to the plurality of limiting protrusions 1140. With the plurality of limiting protrusions 1140 and the plurality of limiting grooves, the piston 114 may be effectively prevented from being separated from the side of the accommodating piece 111 away from the atomizing piece 110. In other embodiments, the inner wall of the accommodating piece 111 may be disposed with a plurality of limiting protrusions, and the outer wall of the piston 114 may be disposed with a plurality of limiting grooves. Alternatively, the inner wall of the accommodating piece 111 away from the atomizing piece 110 may be disposed with a plurality of anti-slip grooves or patterns. That is, the method for preventing the piston 114 from separating from the side of the accommodating piece 111 away from the atomizing piece 110 belongs to the scope of the present disclosure, and the present disclosure is not limited to the embodiments mentioned above.

In some embodiments, the material of the conductor of the transmission wire 112 may include copper, aluminum, molybdenum, tungsten, gold, chromium, nickel, platinum, titanium, iridium, rhodium, or other conductive metal materials, or any combination thereof. In other embodiments, the material of the conductor of the transmission wire 112 may also be a non-metallic material, as long as the material used is conductive. Furthermore, the surface of the conductor may be covered with an insulating layer to prevent the transmission wire 112 from being in contact with other components of the atomizing component 11 and thereby causing a short circuit.

As shown in FIG. 5 and FIG. 6, in some embodiments, the first electrical connector 113 includes a conductive sheet 1130 and a first conductive pillar 1131. The conductive sheet 1130 is electrically connected to the transmission wire 112. The first conductive pillar 1131 is disposed on one side of the conductive sheet 1130, wherein the first conductive pillar 1131 is against the conductive sheet 1130 to be electrically connected to the transmission wire 112. More specifically, the conductive sheet 1130 may be a plum-shaped folding sheet and a via, and the plum-shaped folding sheet surrounds the via. The first conductive pillar 1131 includes a mating terminal end 11311 and a connecting terminal end 11312 that are connected to each other. The cross-sectional area of the mating terminal end 11311 in the radial direction is larger than the cross-sectional area of the connecting terminal end 11312 in the radial direction. The connecting terminal end 11312 of the first conductive pillar 1131 passes through the via, and the mating terminal end 11311 abuts on the plum-shaped folding sheet. However, the present disclosure is not limited thereto. In other embodiments, the first conductive pillar 1131 may also be bonded, welded, snapped, or directly wound, or a method known by a person having ordinary skills in the art to be electrically connected to the conductive sheet 1130. In addition, the first conductive pillar 1131 is electrically connected to the controlling component 21. More specifically, the first conductive pillar 1131 is electrically connected to a first elastic connecting piece 211 in the controlling component 21 (which will be further explained hereinafter).

As shown in FIG. 8, in some embodiments, the piston 114 is formed by coating the permanent magnet 1141 with silicone. However, the present disclosure is not limited thereto. In other embodiments, the piston 114 may also be formed by coating the permanent magnet 1141 with high molecular polymers such as polyethylene, polypropylene, polyvinyl chloride, polyethylene terephthalate, polystyrene, or polycarbonate, or the like. It should be noted that, in addition to high molecular polymers, the piston 114 may also be formed with ceramic materials, metal materials, composite materials, or the like.

In some embodiments, the material of the conductor of the induction coil 115 may include copper, aluminum, molybdenum, tungsten, gold, chromium, nickel, platinum, titanium, iridium, rhodium, or other conductive metal materials, or any combination thereof. In other embodiments, the material of the conductor of the induction coil 115 may also be a non-metallic material, as long as the material used is conductive. Furthermore, the surface of the induction coil 115 may be covered with an insulating layer to prevent the contacting between the various line segments of the induction coil 115 and thereby causing a short circuit.

As shown in FIG. 5 and FIG. 6, in some embodiments, the second electrical connector 116 may include a conductive piece 1160 and a second conductive pillar 1161. The conductive piece 1160 is electrically connected to the conduction coil 115, wherein the second conductive pillar 1161 is against the conductive piece 1160 to be electrically connected to the conduction coil 115. More specifically, the second conductive pillar 1161 includes a mating terminal end 11611 and a connecting terminal end 11612 that are connected to each other. The cross-sectional area of the mating terminal end 11611 in the radial direction is larger than the cross-sectional area of the connecting terminal end 11612 in the radial direction. However, the present disclosure is not limited thereto. In other embodiments, the second conductive pillar 1161 may also be bonded, welded, snapped, or directly wound, or a method known by a person having ordinary skills in the art to be electrically connected to the conductive piece 1160. In addition, the second conductive pillar 1161 is electrically connected to the controlling component 21. More specifically, the second conductive pillar 1161 is electrically connected to a second elastic connecting piece 212 in the controlling component 21 (which will be further explained hereinafter).

As shown in FIG. 8, in some embodiments, the atomizing component 11 may further include a pressure sensor 117. The pressure sensor 117 is disposed in the accommodating piece 111, and the pressure sensor 117 is electrically connected to the controlling component 21. The pressure sensor 117 is configured to sense the pressure in the accommodating piece 111. When the pressure of the accommodating piece 111 is too low, the controlling component 21 controls the piston 114 to move toward the atomizing piece 110 according to the value sensed by the pressure sensor 117. Conversely, when the pressure in the accommodating piece 111 is too high, the controlling component 21 controls the piston 114 to stop moving toward the atomizing piece 110 according to the value sensed by the pressure sensor 117. In some embodiments, the pressure sensor 117 may use one of a capacitive sensor, a piezoelectric sensor, and a piezoresistive sensor according to actual conditions. In some embodiments, the pressure sensor 117 may be plural. The plurality of pressure sensors 117 respectively is disposed at different positions in the accommodating piece 111 to more accurately measure the pressure in the accommodating piece 111.

Figure 9:
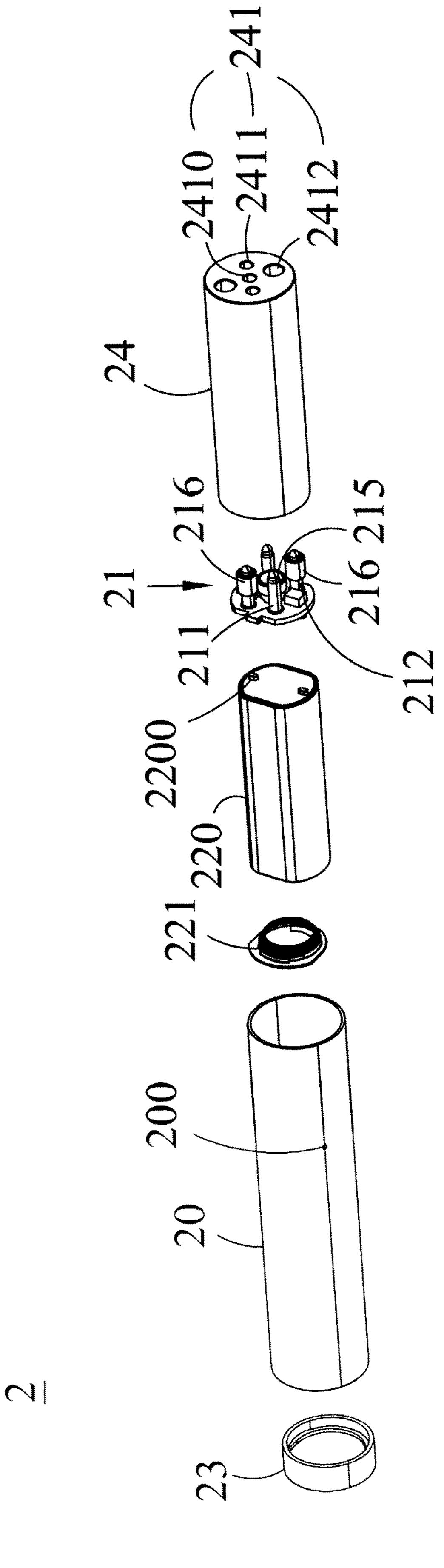
FIG. 9 is an exploded view of the second body of an embodiment of the present disclosure.

FIG. 9 is an exploded view of the second body of an embodiment of the present disclosure. As shown in the figure, in some embodiments, the second outer case 20 may be a hollow cylinder with openings at both ends, and the second outer case 20 covers the controlling component 21 and the battery component 22. More specifically, one end of the second outer case 20 corresponds to the first outer case 10, and a side surface of the second outer case 20 has an air inlet 200 for air intake. Wherein, the air inlet 200 is disposed opposite to the air outlet 100. That is, the air inlet 200 is located on the side of the atomizing component 11 away from the air outlet 100. In other words, the air outlet 100 is located on the side of the atomizing component 11 away from the air inlet 200 (as shown in FIG. 4). In some embodiments, the number of the air inlets 200 may be two, and the two air inlets 200 are respectively disposed at relative positions on the side surface of the second outer case 20. It should be noted that the disclosure is not limited thereto. In other embodiments, the number of the air inlets 200 may be plural (for example three, four, or five). The plurality of air inlets 200 may surround the side surface of the second outer case 20 at intervals, or be collectively disposed according to actual conditions.

Figure 10:
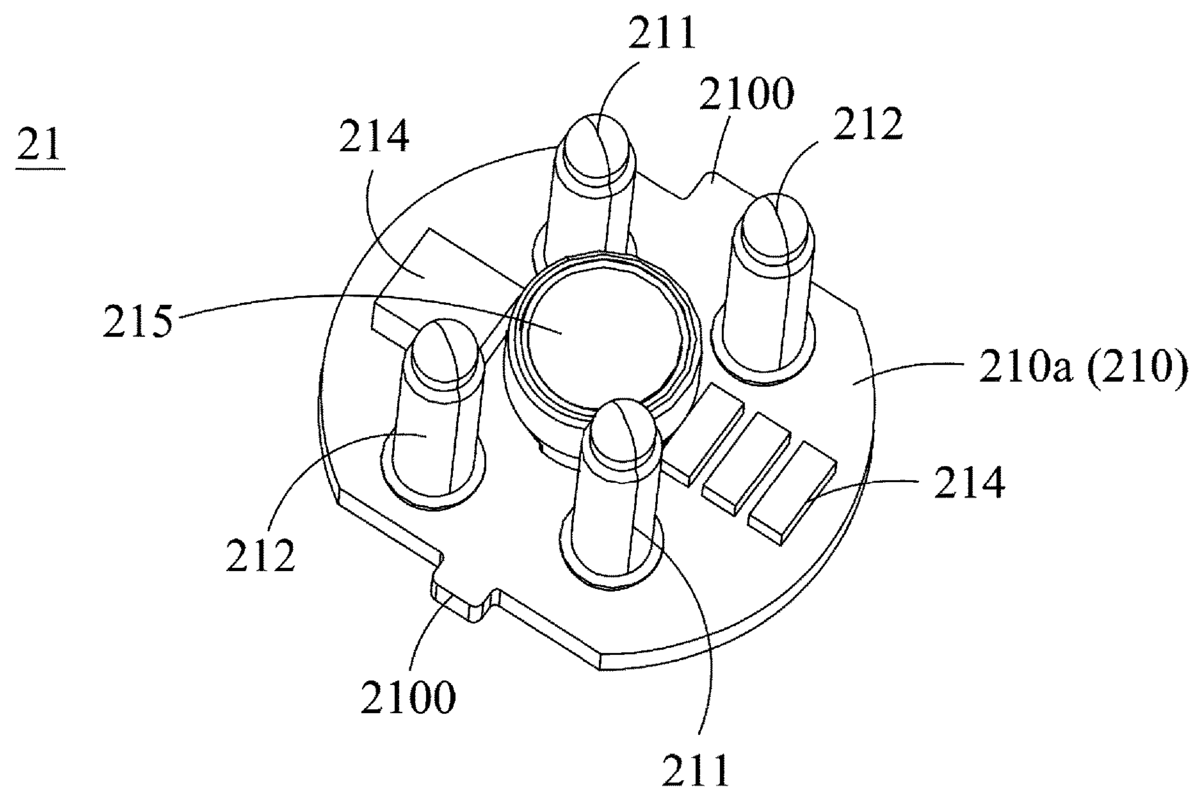
FIG. 10 is a schematic diagram of the controlling component of an embodiment of the present disclosure.
Figure 11:
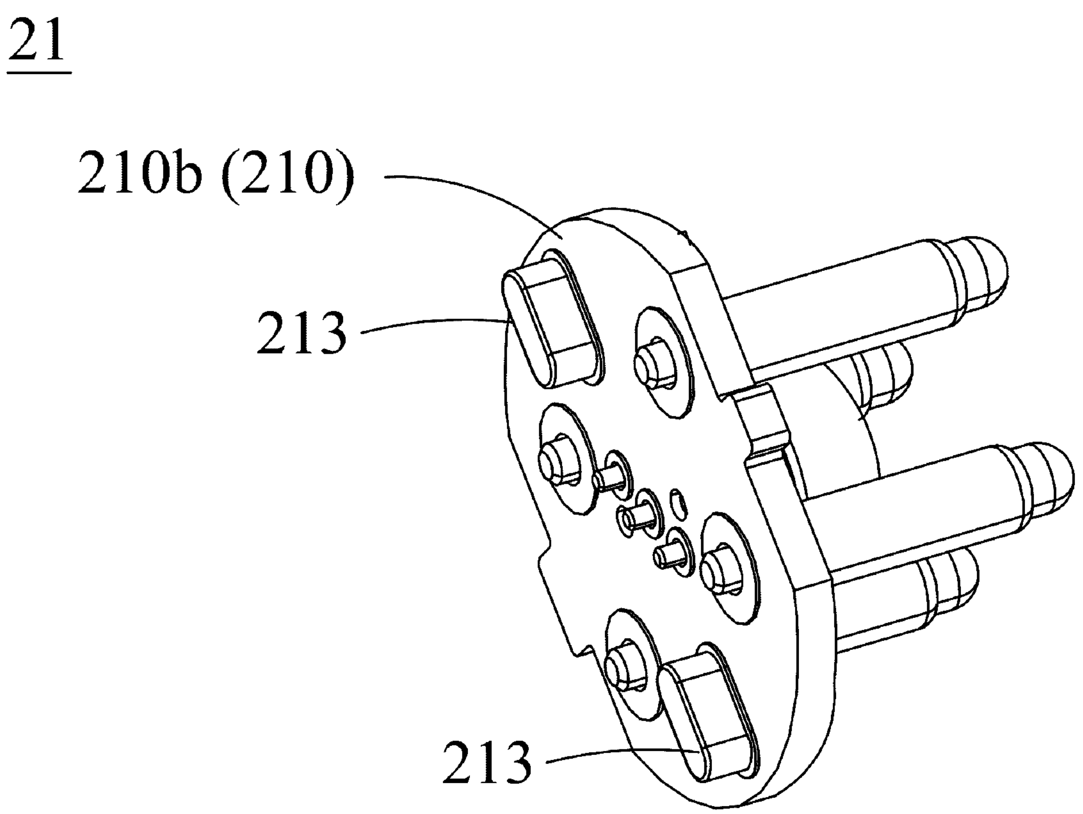
FIG. 11 is another schematic diagram of the controlling component of an embodiment of the present disclosure.

FIG. 10 and FIG. 11 are respectively a schematic diagram and another schematic diagram of the controlling component of an embodiment of the present disclosure. As shown in the figure, in some embodiments, the controlling component 21 may include a substrate 210, a first elastic connecting piece 211, a second elastic connecting piece 212, and a first conductive protrusion 213. The substrate 210 has a first surface 210*a* and a second surface 210*b*. The first elastic connecting piece 211 is disposed on the first surface 210*a*, and the first elastic connecting piece 211 is electrically connected to the atomizing piece 110 of the atomizing component 11. The second elastic connecting piece 212 is disposed on the first surface 210*a*, and the second elastic connecting piece 212 is electrically connected to the induction coil 115 of the atomizing component 11. The first conductive protrusion 213 is disposed on the second surface 210*b*, and the first conductive protrusion 213 is electrically connected to the battery component 22.

In some embodiments, the substrate 210 may be a glass substrate, such as an alkali-containing glass substrate, an alkali-free glass substrate, or a strengthened glass substrate after physical/chemical treatment. The substrate 210 may also be a plastic substrate, such as Poly terephthalate (PET), polycarbonate (PC), polymethyl methacrylate (PMMA), or polycyclic olefin polymer (COP). However, the disclosure is not limited thereto. In other embodiments, any substrate known by a person having ordinary skills in the art may be used in this disclosure.

In some embodiments, the first elastic connecting piece 211 and/or the second elastic connecting piece 212 may be a spring-loaded pin (Pogo Pin), which consists of a plunger, a tube, and a spring constituted. The spring-loaded pin may be adjusted the elasticity of the spring according to requirements to achieve a more stable contact effect. Alternatively, the spring connector can also be electroplated with gold, nickel, or an alloy thereof on the surface according to requirements to increase conductivity and prevent oxidation.

In some embodiments, the number of the first elastic connecting piece 211 may be two, and the number of the first electrical connector 113 may be two. Specifically, one of the two first elastic connecting pieces 211 is a positive terminal, and the other of the two first elastic connecting pieces 211 is a negative terminal.

In some embodiments, the number of second elastic connecting pieces 212 may be two, and the number of second connectors may be two. Specifically, one of the two second elastic connecting pieces 212 is a positive terminal, and the other of the two second elastic connecting pieces 212 is a negative terminal. It should be noted that the second elastic connecting piece 212 is configured to transmit power to the induction coil 115. When the positive and negative terminals of the two second elastic connecting pieces 212 are reversed, the direction of the magnetic field generated by the induction coil 115 will be reversed. In this way, the piston 114 moves in a direction away from the atomizing piece 110. Therefore, in some embodiments, the two second elastic connecting pieces 212 may have opposite magnetic poles, and the two second conductive pillars 1161 may have opposite magnetic poles, respectively. That is, the second elastic connecting piece 212 with the N pole may only be connected to the second conductive pillar 1161 with the S pole. On the other hand, the second elastic connecting piece 212 with the S pole may only be connected to the second conductive pillar 1161 with the N pole. Foolproof may be effectively realized by the two second elastic connecting pieces 212 with opposite magnetic poles, therefore upside-down installation of the first body 1 and the second body 2 may be prevented. Further, the first body 1 and the second body 2 are detachably connected along the axial direction d by the magnetic butt of the second electrical connector 116 and the second elastic connecting piece 212. It should be noted that the implementation mentioned above are only examples, and the disclosure is not limited thereto.

In other embodiments, the second elastic connecting piece 212 and the second conductive pillar 1161 may also be disposed with a specific shape or with a specific groove, engaging portion, etc., to realize foolproof. Alternatively, the two second elastic connecting piece 212 may also be respectively sleeved on two sleeves with opposite magnetic poles (sleeve 216 in FIG. 9), so as to be connected to the two second conductive pillars 1161 with opposite magnetic poles. Wherein, the sleeve 216 may be fixed to the second elastic connecting piece 212 by engagement, bonding, welding, etc., but the present disclosure is not limited thereto.

In some embodiments, the first conductive protrusion 213 may be a metal connector with no elasticity and is electrically connected to the battery component 22. Alternatively, the first conductive protrusion 213 may also be a metal joint with elasticity similar to the first elastic connecting piece 211 or the second elastic connecting piece 212.

In some embodiments, the controlling component 21 may further include a controlling chip 214 and a gas flow sensor 215. The gas flow sensor 215 is disposed on the first surface 210*a* of the substrate 210, and the gas flow sensor 215 is electrically connected to the controlling chip 214. For example, the controlling chip 214 may include memory, driver, encoder, read-write circuit, controlling circuit, and other components known by a person having ordinary skills in the art. The gas flow sensor 215 may be one of an absolute pressure sensor, a gauge sensor, a gauge sensor, and a differential pressure sensor, or any gas flow sensor known by a person having ordinary skills in the art. The position of the gas flow sensor 215 corresponds to the air inlet 200 of the atomizing device, so as to detect the passing of the gas flow when the atomizing device is used. When a gas flow is detected, the gas flow sensor 215 transmits the detection result to the controlling chip 214, and the controlling chip 214 may control other components according to the detection result. For example, the controlling component 21 receives the power provided from the battery component 22 and provides the power to the atomizing component 11 through the first elastic connecting piece 211 and the second elastic connecting piece 212. With the specific configuration mentioned above, the atomizing piece 110 and the induction coil 115 in the atomizing component 11 may operate according to the flow mentioned above, therefore a stable atomizing effect may be achieved.

As shown in FIG. 9, in some embodiments, the battery component 22 may include a battery 220 and an abutting piece 221. The battery 220 is disposed in the second outer case 20. Wherein, the battery 220 has a second conductive protrusion 2200, and the second conductive protrusion 2200 is electrically connected to the controlling component 21. More specifically, the second conductive protrusion 2200 of the battery 220 abuts the first conductive protrusion 213 on the controlling component 21.

In some embodiments, the battery 220 may be a reusable lithium battery, which may be charged by an external power source to provide power for the atomizing device again. Alternatively, the battery 220 may also be a single-use carbon-zinc battery, which may be quickly replaced by disassembling the atomizing device. It should be noted that the battery types mentioned above are only examples, and any battery known by a person having ordinary skills in the art may be used in the present disclosure.

The abutting piece 221 is disposed on one side of the battery 220 away from the second conductive protrusion 2200. In some embodiments, the abutting piece 221 is composed of a bottom plate and a spring. The abutting piece 221 is configured to provide pressure to the battery 220 so that the battery 220 may be continuously pressed against the controlling component 21.

In the hereinbefore, the first outer case 10, the atomizing component 11, the second outer case 20, the controlling component 21, and the battery component 22 in the atomizing device have been explained in detail. However, the atomizing device of the present disclosure is not limited to the elements mentioned above. In the hereinafter, the present disclosure will further provide other elements or structures that may be disposed in the atomizing device, so that the atomizing device of the present disclosure has more excellent and diversified technical effects.

Figure 12:
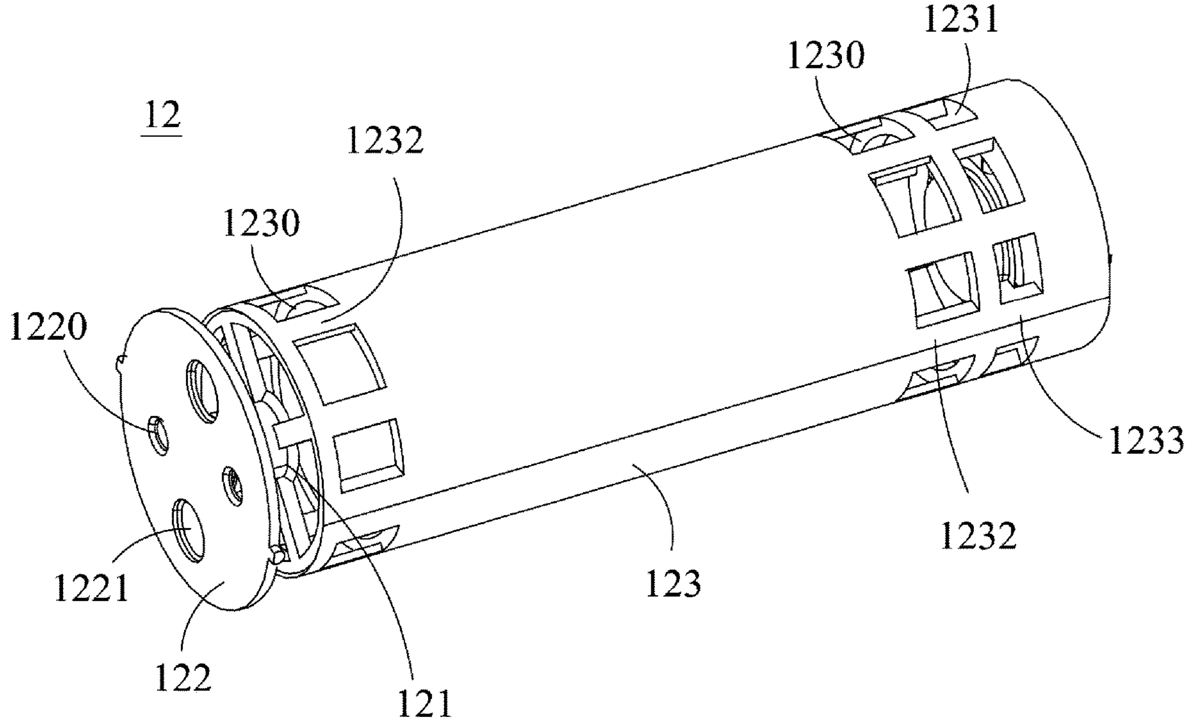
FIG. 12 is a schematic diagram of the diversion channel of an embodiment of the present disclosure.

As shown in FIG. 4, FIG. 8, and FIG. 12, wherein FIG. 12 is a schematic diagram of the diversion channel of an embodiment of the present disclosure. In some embodiments, a diversion channel 12 may be formed between the first outer case 10 and the atomizing component 11, and the diversion channel 12 surrounds the atomizing component 11. The diversion channel 12 is a fluid channel for conveying gas. Therefore, the diversion channel in FIG. 12 may not have a solid body, which is formed by the gap between the first outer case 10 and the atomizing component 11. It should be noted that the present disclosure is not limited to the diversion channel 12 only containing air. In other embodiments, the diversion channel 12 may also include a sponge, film, or filler with high air permeability, so as to realize the filtering or diversion function in the process of conducting air. In addition, the first body 1 and the second body 2 are configured to be detachably connected to each other along the axial direction d, therefore the air inlet 200, the diversion channel 12, and the air outlet 100 are fluidly communicated to each other.

Specifically, the gas entering the atomizing device from the air inlet 200 will be diverted by the diversion channel 12 and mixed with the atomized filler at the plurality of atomizing holes of the atomizing piece 110. With the design of split flow first and then mixed flow, users may obtain atomized gas/liquid with sufficient kinetic energy and uniform mixing. Therefore, by designing the diversion channel 12, the atomizing device of the present disclosure may provide a more excellent user experience.

As shown in FIG. 12, in some embodiments, the diversion channel 12 may have a connecting space 121, a disc space 122 located on one side of the connecting space 121, and a cylindrical space 123 located on the other side of the connecting space 121. The disc space 122 is communicated with the air inlet 200, and the cylindrical space 123 is communicated with the air outlet 100. Wherein, the outer diameter of the disc space 122 is larger than the outer diameter of the cylindrical space 123, but the present disclosure is not limited thereto. The size and shape of each part of the diversion channel 12 may be adjusted according to actual requirements to achieve the best diversion effect.

Figure 13:
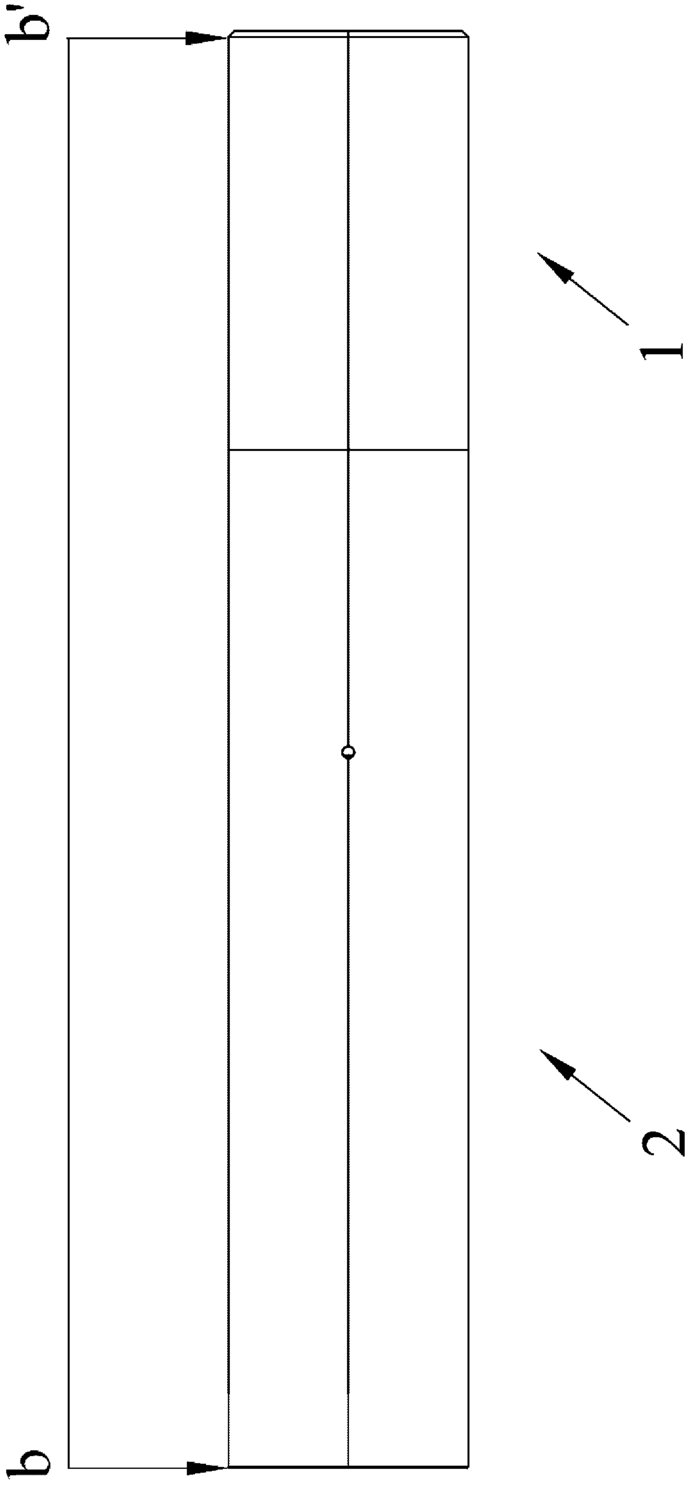
FIG. 13 is another side view of the atomizing device of an embodiment of the present disclosure.
Figure 14:
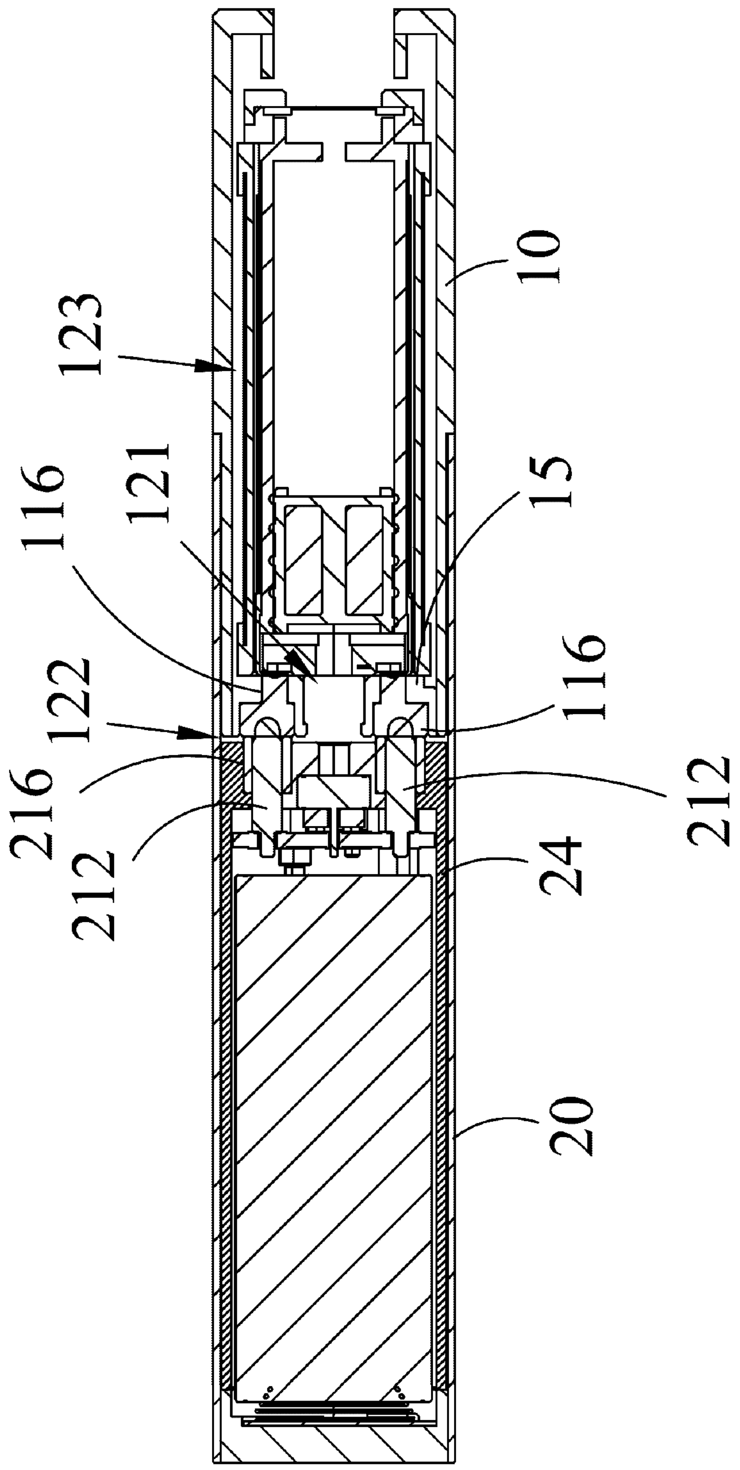
FIG. 14 is a cross-sectional view taken along the line b-b' in FIG. 13.
Figure 15:
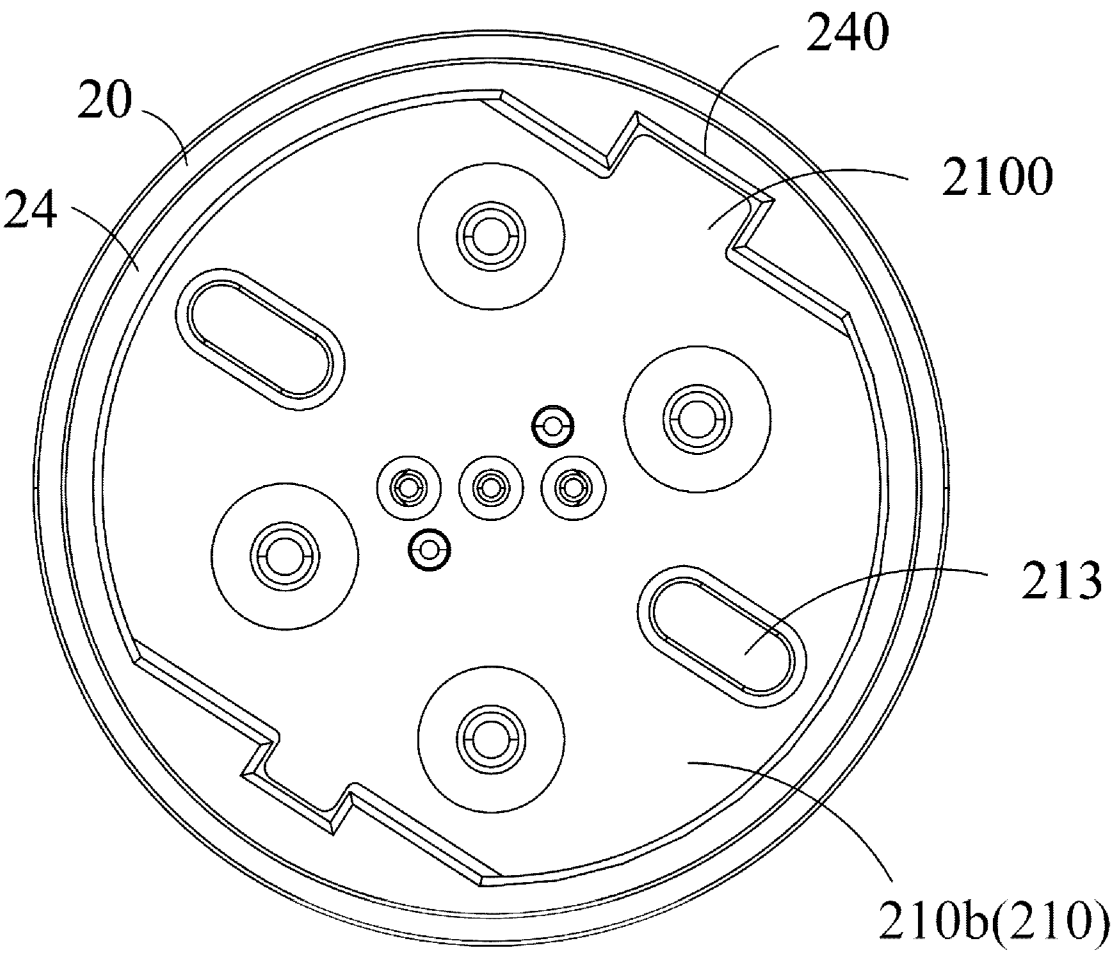
FIG. 15 is a schematic diagram of the assembling of the second inner case and the controlling component of an embodiment of the present disclosure.

As shown in FIG. 12 to FIG. 14, wherein FIG. 13 and FIG. 14 are respectively another side view of the atomizing device of an embodiment of the disclosure and a cross-sectional view along the line b-b' in FIG. 13. In some embodiments, the disc space 122 and the cylindrical space 123 are located at opposite sides of the first electrical connector 113 and the second electrical connector 116, and the connecting space 121 is located between the first electrical connector 113 and the second electrical connector 116. More specifically, the first elastic connecting piece 211 passes through the position 1220 shown in FIG. 12 and is connected to the first electrical connector 113. In addition, the second elastic connecting piece 212 and the sleeve 216 pass through the position 1221 shown in FIG. 12 and are connected to the second electrical connector 116.

As shown in FIG. 3, FIG. 4, and FIG. 12. In some embodiments, the atomizing device may further include a first inner case 13, and the first inner case 13 is sleeved outside the atomizing component 11. Wherein, the first inner case 13 and the first outer case 10 jointly form one side of the cylindrical space 123 close to the connecting space 121 (ie, the left side of the cylindrical space 123 in FIG. 12). The first inner case 13 has a plurality of first diversion protrusions 130 and a plurality of first distribution channels 131 on the side surface close to the two end surfaces. The plurality of first diversion protrusions 130 contact the first outer case 10 to form a gas conducting channel between two adjacent first diversion protrusions 130, and the channel is the first distribution channel 131. That is, each first distribution channel 131 is located between two adjacent first diversion protrusions 130. Wherein, the area in the cylindrical space 123 corresponding to the plurality of first distribution channels 131 is defined as a first distribution space 1232, and the first distribution space 1232 is formed by the plurality of first distribution channels 131. More specifically, the position 1230 in FIG. 12 is where the first diversion protrusions 130 is located. With the first diversion protrusion 130, the passing route of the gas may be more complicated. The gas passed a complicated passing route may continuously be diverted and mixed to make the mixing more uniform. When the gas passes through the first diversion protrusion 130 (that is, the position 1230 in FIG. 12), the first diversion protrusion 130 will divert the gas to the first distribution channels 131 on both sides (that is, the first distribution space 1232), and the gas will be mixed again after passing through the first distribution channel 131.

In some embodiments, the plurality of first diversion protrusions 130 surrounds the side surface of the first inner case 13 in sequence and at equal intervals. It should be noted that the position, shape, and number of the first diversion protrusion 130 in the figure are all examples, and the present disclosure is not limited thereto.

In some embodiments, the atomizing device may further include a first base 14, and the first base 14 is disposed on one side of the atomizing component 11 close to the air outlet 100. Wherein, the first base 14 and the first outer case 10 jointly form one side of the cylindrical space 123 away from the connecting space 121 (ie, the right side of the cylindrical space 123 in FIG. 12). The first base 14 has a plurality of second diversion protrusions 140 and a plurality of second distribution channels 141. The plurality of second diversion protrusions 140 contact the first outer case 10 to form a gas conducting channel between two adjacent second diversion protrusions 140, and the channel is the second distribution channel 141. That is, each second distribution channel 141 is located between two adjacent second diversion protrusions 140. Wherein, the area in the cylindrical space 123 corresponding to the plurality of second distribution channels 141 is defined as a second distribution space 1232, and the second distribution space 1232 is formed by the plurality of second distribution channels 141. More specifically, the position 1231 in FIG. 12 is where the second diversion protrusions 140 is located. With the second diversion protrusion 140, the passing route of the gas may be more complicated. The gas passed a complicated passing route may continuously be diverted and mixed to make the mixing more uniform. Taking the FIG. 12 as an example, when the gas passes through the second diversion protrusion 140 (that is, the position 1231), the second diversion protrusion 140 will divert the gas to the second distribution channels 141 on both sides (that is, the second distribution space 1233), and the gas will be mixed again after passing through the second distribution channel 141.

In some embodiments, the plurality of second diversion protrusions 140 surrounds the side surface of the first base 14 in sequence and at equal intervals. It should be noted that the position, shape, and number of the second diversion protrusions 140 in the figure are all examples, and the present disclosure is not limited thereto.

In some embodiments, an air-permeable sponge or other similar highly air-permeable elements may also be disposed in the connecting space 121. By adjusting the density or material of the highly permeable element, the moving speed of the gas in the diversion channel 12 may be adjusted or the impurities in the gas may be filtered.

In some embodiments, the atomizing device may further include a second inner case 24 and a second base 15. The second inner case 24 is located on one side of the second outer case 20 close to the first outer case 10, and the second inner case 24 is in contact with the inner peripheral surface of the second outer case 20. More specifically, the controlling component 21 and the battery component 22 are configured to be sequentially installed into the second inner case 24 along the axial direction d, and the second inner case 24 is configured to be installed into the second outer case 20 along the axial direction d. The second base 15 is disposed on one side of the atomizing component 11 close to the air outlet 100 and is in contact with the inner surface of the first outer case 10. The second base 15 surrounds the connecting space 121 and is located between the cylindrical space 123 and the disc space 122. Wherein, the first body 1 and the second body 2 are configured to be detachably connected along the axial direction d to space the second inner case 24 and the second base 15 from each other. Therefore, the second outer case 20, the second inner case 24, the first outer case 10, and the second base 15 together form a disc space 122.

In some embodiments, the battery component 22 is disposed in the second inner case 24. By disposing the second inner case 24, the battery 220 may be prevented from sliding in the second outer case 20.

In the case that the second inner case 24 is disposed with a limiting groove 240, the substrate 210 of the controlling component 21 may have limiting protrusions 2100 on both sides (as shown in FIG. 10), and the limiting protrusions 2100 are engaged with the limiting groove 240 of the second inner case 24. By engaging the limiting protrusion 2100 and the limiting groove 240 of the second inner case 24 with each other, the displacement of the controlling component 21 may be prevented. Further, the limiting protrusions 2100 on both sides of the substrate 210 may have different sizes, and the limiting grooves 240 on both sides of the second inner case 24 may also have different sizes. By disposing the limiting protrusions 2100 of different sizes, the effect of foolproof may be realized.

Figure 16:
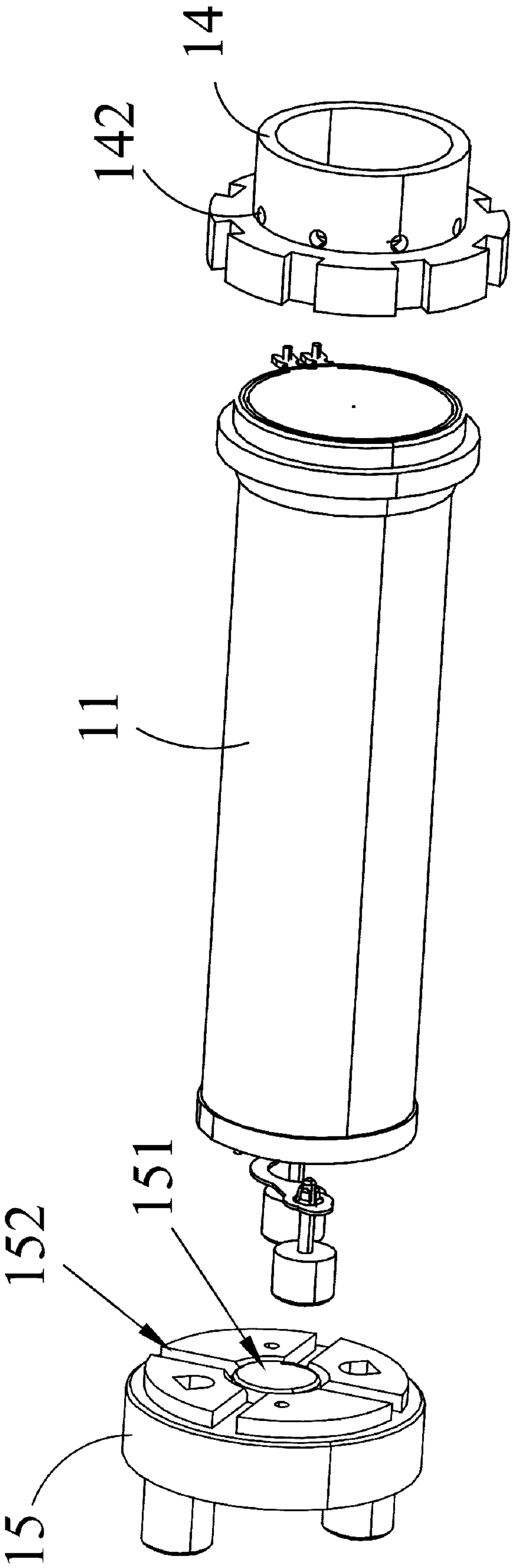
FIG. 16 is a schematic diagram of the first base, the atomizing component, and the second base of an embodiment of the present disclosure.

FIG. 16 is a schematic diagram of the first base, the atomizing component, and the second base of an embodiment of the present disclosure. As shown in FIG. 9 and FIG. 16, in some embodiments, the disc space 122 is formed between the second inner case 24 and the second base 15. For example, the second inner case 24 is located on one side of the second outer case 20 close to the first outer case 10 and in contact with the inner surface of the second outer case 20. The second base 15 is located on one side of the first outer case 10 close to the second outer case 20 and in contact with the inner surface of the first outer case 10. The second inner case 24 and the second base 15 are spaced apart from each other. The second outer case 20, the second inner case 24, the first outer case 10, and the second base 15 are jointly form the disc space 122. The second inner case 24 has a connecting via 241. The connecting via 241 includes a sensor via 2410. The sensor via 2410 is communicated with the gas flow sensor 215 and the air inlet 200. The gas flow sensor 215 is located on one side of the sensor via 2410 and the disc space 122 is formed on the other side of the sensor via 2410. The second base 15 includes a middle via 151 and a base distribution channel 152. The middle via 151 forms a connecting space 121, and the middle via 151 and the sensor via 2410 are aligned the axial direction d. An air-permeable sponge is disposed in the middle via 151. The base distribution channel 152 is located on the side surface of the second base 15 contacting the atomizing component 11, and the base distribution channel 152 is communicated with the connecting space 121 and the cylindrical space 123. The number of the base distribution channel 152 is plural and annularly arranged. The gas entered from the air inlet 200 comes to the disc space 122 and diverges. A part of the gas flows to the gas flow sensor 215 through the sensor via 2410, and the other is to enter the connecting space 121 of the middle via 151. After passing through the connecting space 121, the gas is divided again, a part of the gas enters the atomizing component 11, and the other enters the cylindrical space 123 through the base distribution channel 152.

As shown in FIG. 16, in some embodiments, the first base 14 may further have an air outlet via 142 penetrating in a radial direction, and the air outlet via 142 is communicated with the cylindrical space 123 and the air outlet 100. The number of the air outlet via 142 may be plural, and the plurality of air outlet via 142 are arranged in a ring shape and are spaced apart from each other.

As shown in FIG. 9, in some embodiments, the connecting via 241 may further include a first connecting via 2411 and a second connecting via 2412. The first elastic connecting piece 211 is disposed in the first connecting via 2411, and the second elastic connecting piece 212 and the sleeve 216 are disposed in the second connecting via 2412.

As shown in FIG. 9, in some embodiments, the second body 2 may further include a fixing plug 23, and the fixing plug 23 is detachably disposed on one side of the second outer case 20 away from the first outer case 10.

In some embodiments, the fixing plug 23 may be detachably connected to the second outer case 20 by a method known by a person having ordinary skills in the art, such as thread, locking, turning shaft, and the like. Furthermore, with the fixing plug 23 which is easy to detach, the user may quickly replace the battery 220 in the second outer case 20. In addition, with the fixing plug 23 which is easy to detach, the user may quickly maintain the components of the atomizing device.

As mentioned above, the present disclosure provides an atomizing device with an excellent atomizing function. Furthermore, the present disclosure also provides an assembling method of the atomizing device, and the assembling method is used to manufacture the atomizing device mentioned above. It should be noted that the order of the steps is not fixed and the order of the steps is not necessary. Some of the steps may be performed at the same time, and some of the steps may be omitted or added. The present flowchart describes the technical features of the steps of the disclosure in a broad and simple manner, and the sequence and number of steps in the assembly method of the disclosure are not limited to the present flowchart.

Figure 17:
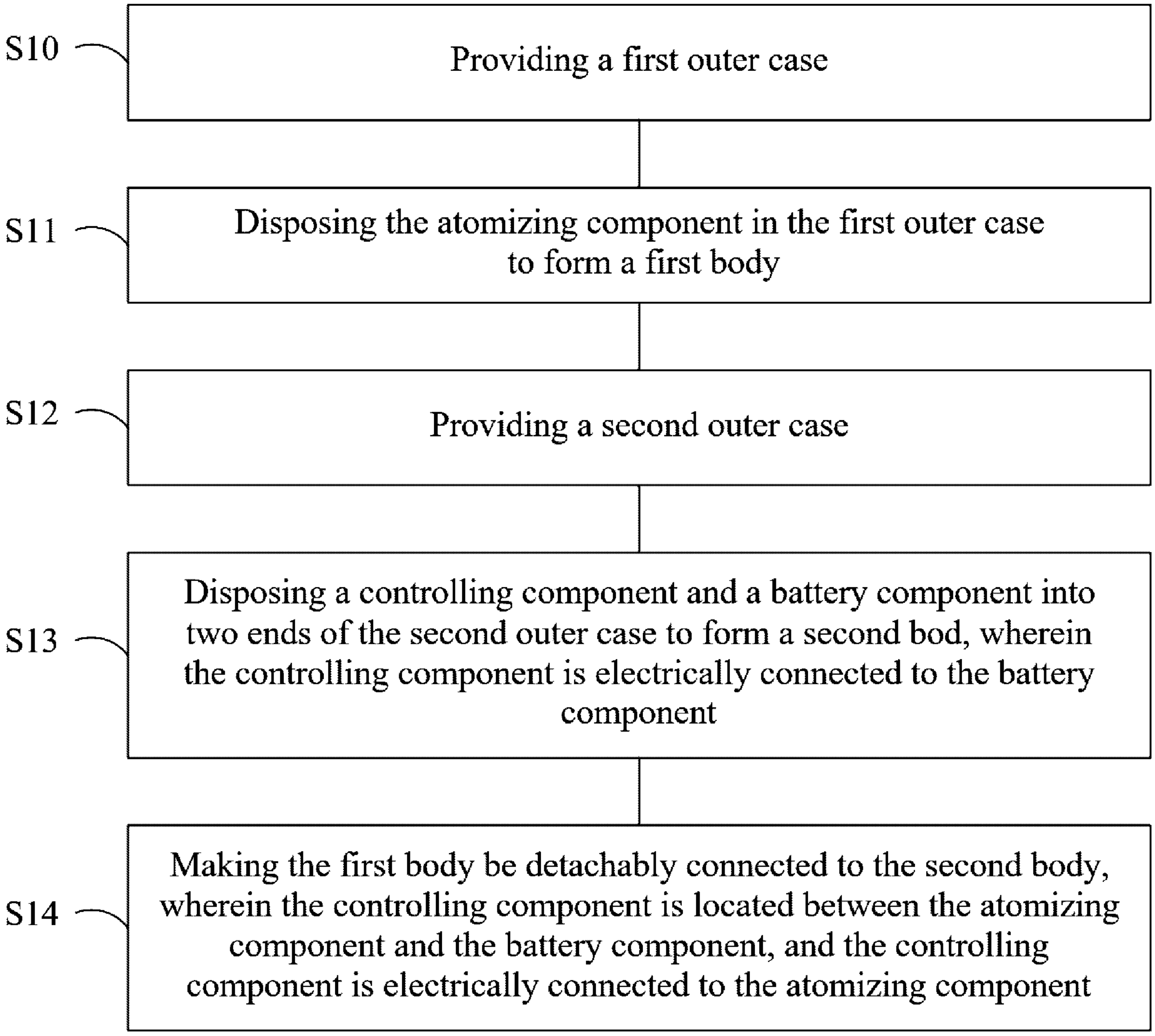
FIG. 17 is a flowchart of the assembling method of the atomizing device of an embodiment of the present disclosure.

FIG. 17 is a flowchart of the assembling method of an atomizing device of an embodiment of the present disclosure. As shown in the figure, the assembling method of the atomizing device includes:

Step S10: Providing a first outer case 10. Wherein, the first outer case 10 is a hollow cylinder with openings at both ends.

Step S11: Disposing the atomizing component 11 in the first outer case 10 to form a first body 1.

Step S12: Providing a second outer case 20. Wherein, the second outer case 20 is a hollow cylinder with openings at both ends.

Step S13: Disposing a controlling component 21 and a battery component 22 into two ends of the second outer case 20 to form a second body 2. Wherein, the controlling component 21 is electrically connected to the battery component 22.

Step S14: Making the first body 1 be detachably connected to the second body 2. Wherein, the controlling component 21 is located between the atomizing component 11 and the battery component 22, and the controlling component 21 is electrically connected to the atomizing component 11.

Figure 18:
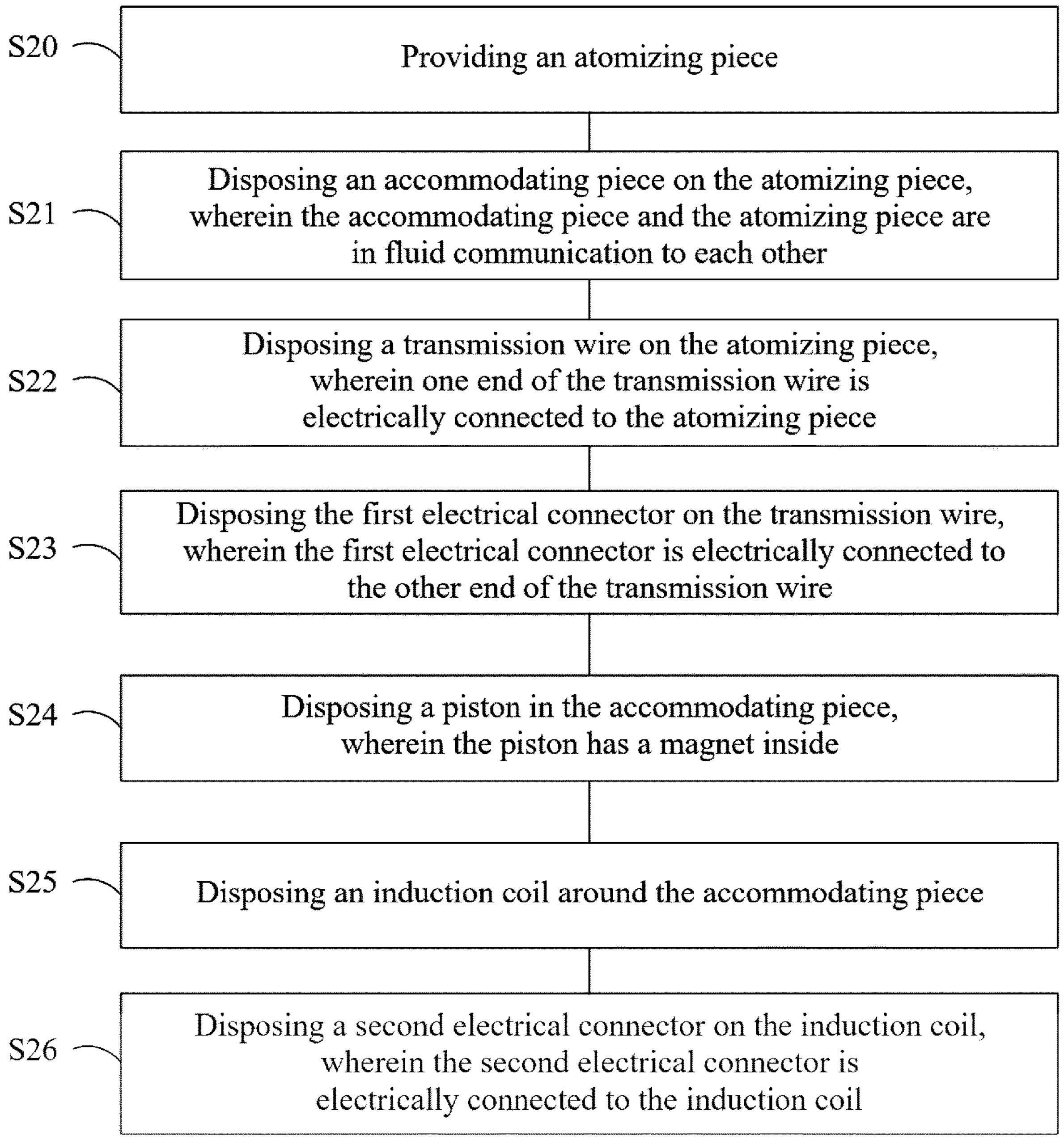
FIG. 18 is a flowchart of the assembling method of the atomizing component of an embodiment of the present disclosure.

FIG. 18 is a flowchart of the assembling method of an atomizing component of an embodiment of the present disclosure. As shown in the figure, before step S11, the assembling method of the atomizing assembly 11 may include the following steps:

Step S20: Providing an atomizing piece 110.

Step S21: Disposing an accommodating piece 111 on the atomizing piece 110. Wherein, the accommodating piece 111 and the atomizing piece 110 are in fluid communication to each other. More specifically, the atomizing piece 110 is placed on an opening of the accommodating piece 111.

Step S22: Disposing a transmission wire 112 on the atomizing piece 110. Wherein, one end of the transmission wire 112 is electrically connected to the atomizing piece 110. In some embodiments, the transmission wire 112 may be fixed on the U-shaped groove of the atomizing piece 110 by crimping.

Step S23: Disposing the first electrical connector 113 on the transmission wire 112. Wherein, the first electrical connector 113 is electrically connected to the other end of the transmission wire 112. In some embodiments, the first electrical connector 113 includes a conductive sheet 1130 and a first conductive pillar 1131. Wherein, the first conductive pillar 1131 may be fixed on the conductive sheet 1130 by crimping, and the conductive sheet 1130 may be fixed on the transmission wire 112 by welding, but the present disclosure is not limited thereto.

Step S24: Disposing a piston 114 in the accommodating piece 111. Wherein, the piston 114 has a magnet inside.

Step S25: Disposing an induction coil 115 around the accommodating piece 111. Wherein, the gap of each line segment of the induction coil 115 may be adjusted according to requirements.

Step S26: Disposing a second electrical connector 116 on the induction coil 115. Wherein, the second electrical connector 116 is electrically connected to the induction coil 115. In some embodiments, the second electrical connector 116 may include a conductive piece 1160 and a second conductive pillar 1161. Wherein, the second conductive pillar 1161 may be fixed on the conductive piece 1160 by crimping, and the conductive piece 1160 may be fixed on the induction coil 115 by welding, but the present disclosure is not limited thereto.

Figure 19:
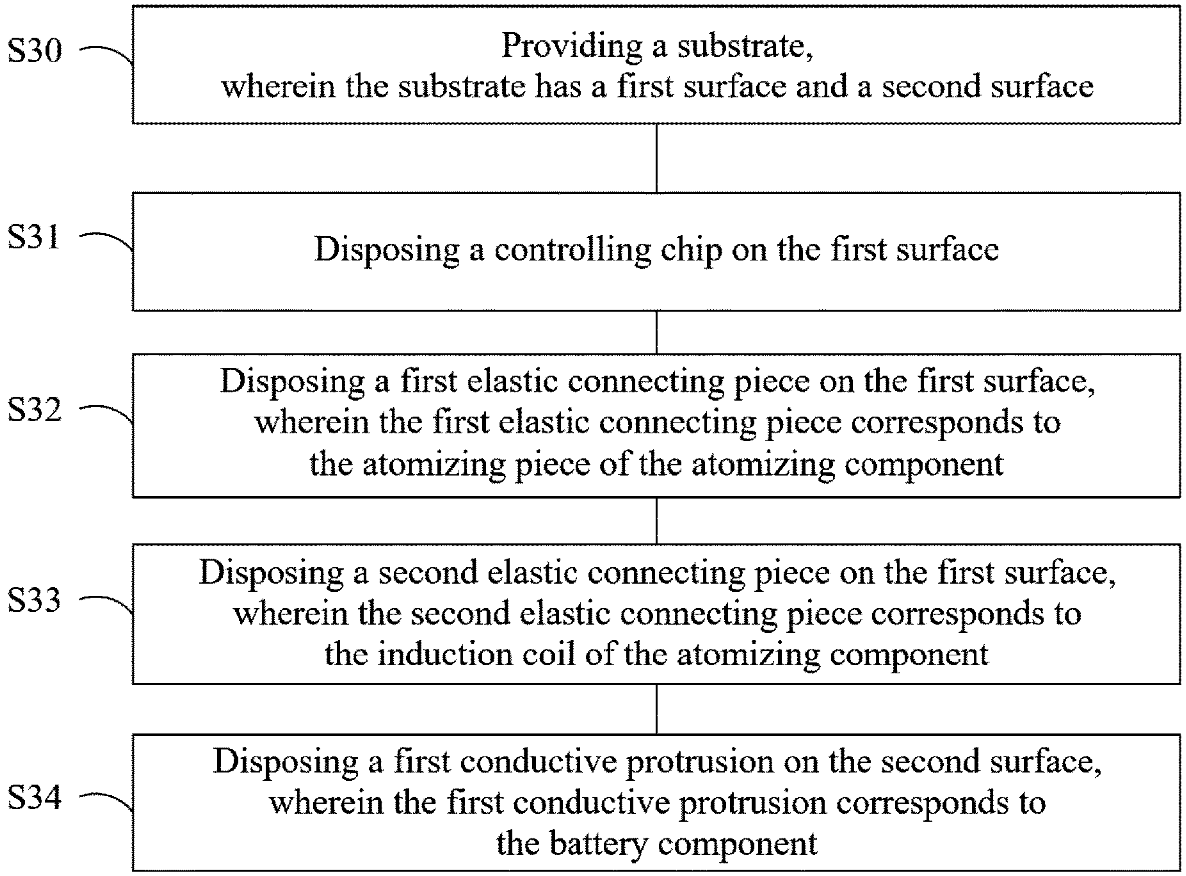
FIG. 19 is a flowchart of the method for assembling the controlling component of an embodiment of the present disclosure.

FIG. 19 is a flowchart of the assembling method for the controlling component of an embodiment of the present disclosure. As shown in the figure, before step S13, the assembling method of the controlling component 21 may include the following steps:

Step S30: Providing a substrate 210. Wherein, the substrate 210 has a first surface 210*a* and a second surface 210*b*.

Step S31: Disposing a controlling chip 214 on the first surface 210*a*. In some embodiments, the controlling chip 214 may be integrated on the substrate 210 by a semiconductor process.

Step S32: Disposing a first elastic connecting piece 211 on the first surface 210*a*. Wherein, the first elastic connecting piece 211 corresponds to the atomizing piece 110 of the atomizing component 11. In some embodiments, the first elastic connecting piece 211 may be formed on the substrate 210 by welding.

Step S33: Disposing a second elastic connecting piece 212 on the first surface 210*a*. Wherein, the second elastic connecting piece 212 corresponds to the induction coil 115 of the atomizing component 11. In some embodiments, the second elastic connecting piece 212 may be formed on the substrate 210 by welding.

Step S34: Disposing a first conductive protrusion 213 on the second surface 210*b*. Wherein, the first conductive protrusion 213 corresponds to the battery component 22. In some embodiments, the first conductive protrusion 213 may be formed on the substrate 210 by welding.

FIG. 20 is another flowchart of the assembling method of the atomizing device of the present disclosure. As shown in the figure, in some embodiments, step S14 may be implemented by the following sub steps:

Sub step S140: Installing the atomizing component 11 into the first outer case 10 along an axial direction d to form the first body 1. Wherein, the atomizing component 11 may be put into the first outer case 10 through one opening of the first outer case 10 and be assembled in the first outer case 10 by snapping, locking, bonding, etc. However, the present disclosure is not limited thereto.

Sub step S141: Installing the controlling component 21 and the battery component 22 into the second outer case 20 along the axial direction d to form the second body 2. Wherein, the controlling component 21 and the battery component 22 may be put into the second outer case 20 through one opening of the second outer case 20 and be assembled in the second outer case 20 by snapping, locking, bonding, etc. However, the present disclosure is not limited thereto.

Sub step S142: Making the second body 2 detachably connected to the first body 1 along the axial direction d. Wherein, the second body 2 may be assembled on the first body 1 by means of snaps, locks, etc. However, the present disclosure is not limited thereto. For example, the first body 1 and the second body 2 may have threads corresponding to each other, and the first body 1 and the second body 2 are fixed to each other by the corresponding threads.

Figure 21:
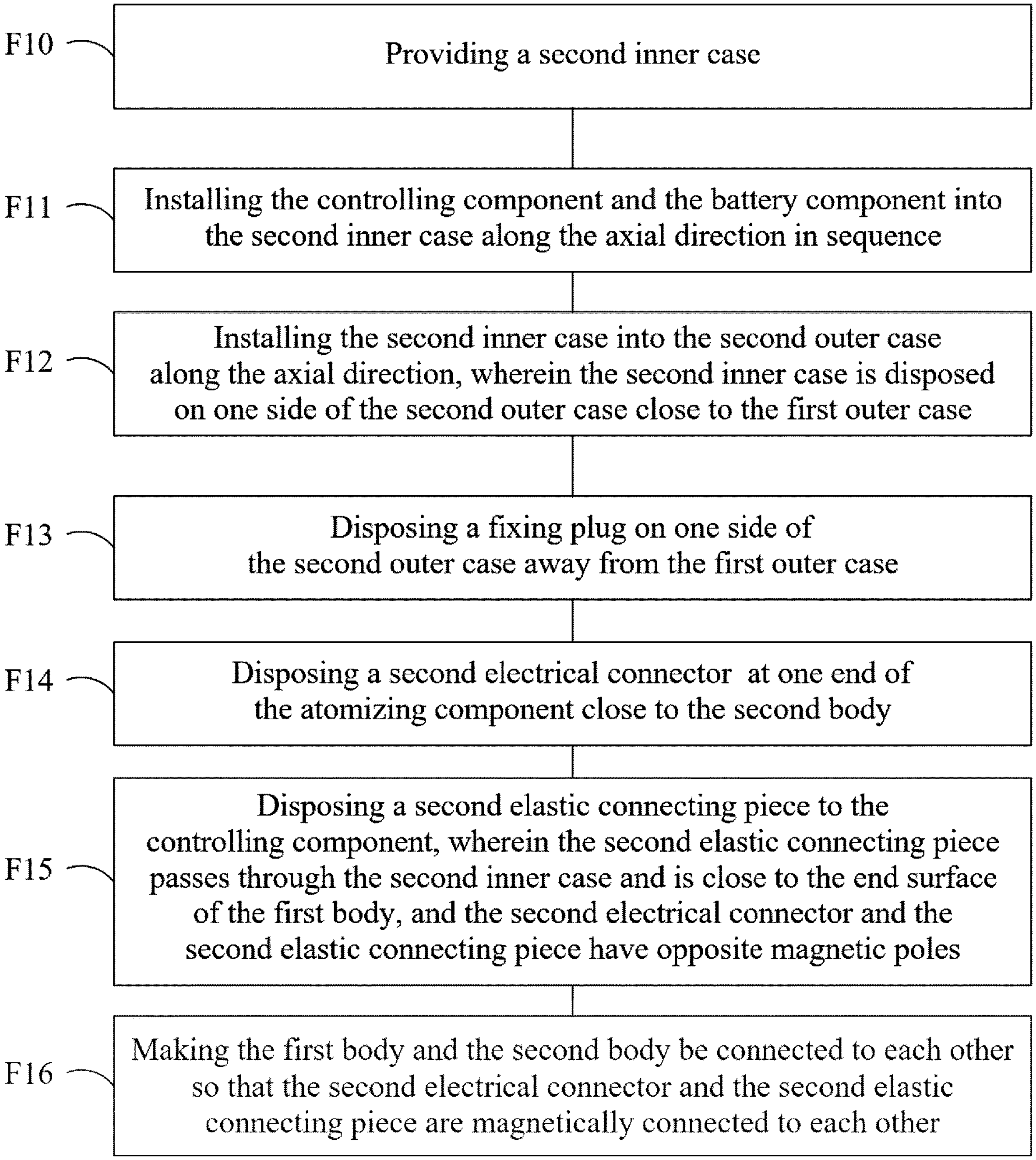
FIG. 21 is another flowchart of the assembling method of the atomizing device of an embodiment of the present disclosure.

FIG. 21 is another flowchart of the assembling method of the atomizing device of the present disclosure. As shown in the figure, in some embodiments, sub step S141 and sub step S142 may also include the following flows:

Flow F10: Providing a second inner case 24.

Flow F11: Installing the controlling component 21 and the battery component 22 into the second inner case 24 along the axial direction d in sequence.

Flow F12: Installing the second inner case 24 into the second outer case 20 along the axial direction d. Wherein, the second inner case 24 is disposed on one side of the second outer case 20 close to the first outer case 10.

Flow F13: Disposing a fixing plug 23 on one side of the second outer case 20 away from the first outer case 10.

Flow F14: Disposing a second electrical connector 116 at one end of the atomizing component close to the second body 2.

Flow F15: Disposing a second elastic connecting piece 212 to the controlling component 21. Wherein, the second elastic connecting piece 212 passes through the second inner case 24 and is close to the end surface of the first body 1. The second electrical connector 116 and the second elastic connecting piece 212 have opposite magnetic poles.

Flow F16: Making the first body 1 and the second body 2 be connected to each other so that the second electrical connector 116 and the second elastic connecting piece 21 are magnetically connected to each other.

Figure 22:
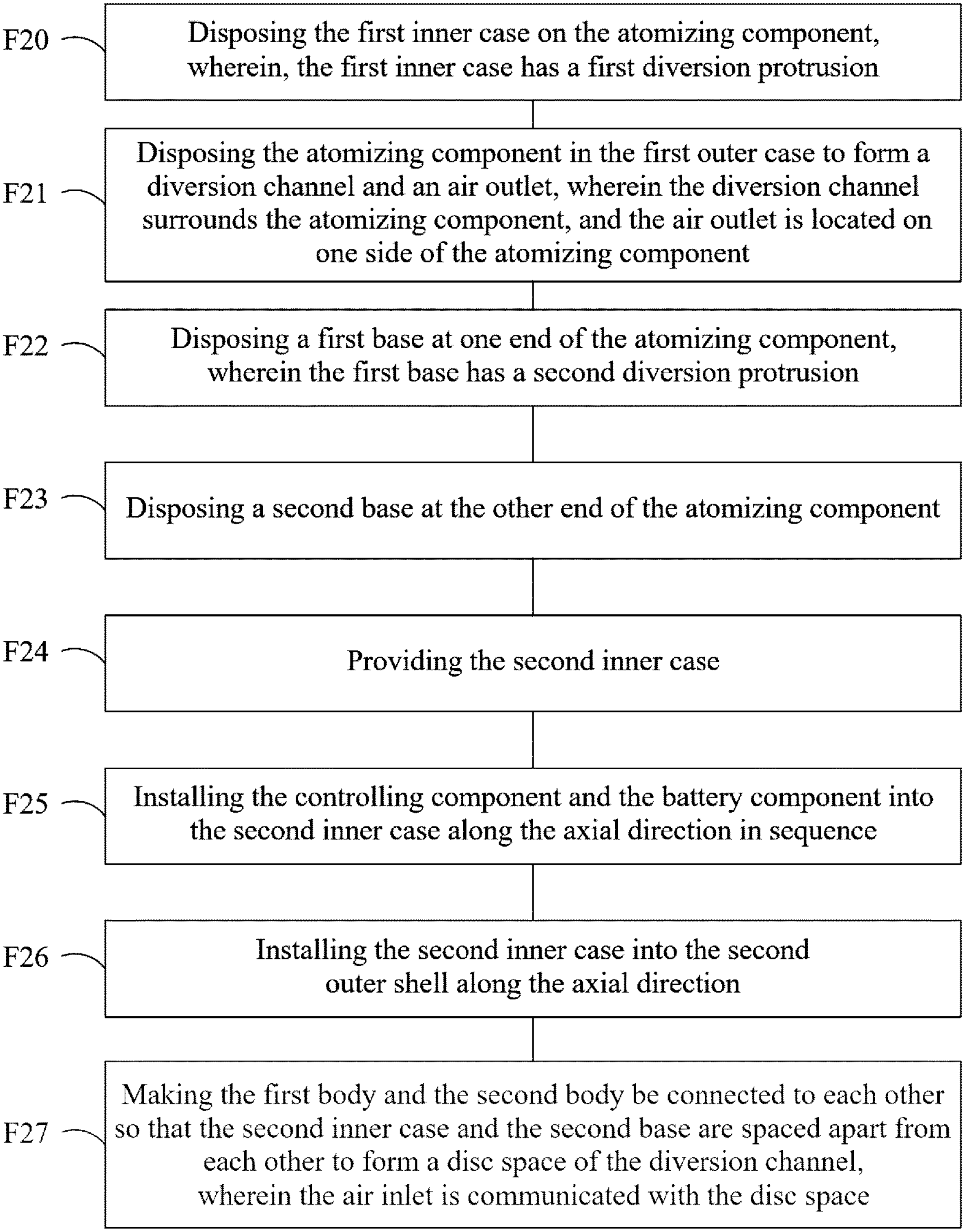
FIG. 22 is another flowchart of the assembling method of the atomizing device of an embodiment of the present disclosure.

FIG. 22 is another flowchart of the assembling method of the atomizing device of the present disclosure. As shown in the figure, in some embodiments, sub step S140 to sub step S142 may also include the following flows:

Flow F20: Disposing the first inner case 13 on the atomizing component 11. Wherein, the first inner case 13 has a first diversion protrusion 130.

Flow F21: Disposing the atomizing component 11 in the first outer case 10 to form a diversion channel 12 and an air outlet 100. Wherein, the diversion channel 12 surrounds the atomizing component 11, and the air outlet 100 is located on one side of the atomizing component 11.

Flow F22: Disposing a first base 14 at one end of the atomizing component 11. Wherein, the first base 14 has a second diversion protrusion 140.

Flow F23: Disposing a second base 15 at the other end of the atomizing component 11.

Flow F24: Providing the second inner case 24.

Flow F25: Installing the controlling component 21 and the battery component 22 into the second inner case 24 along the axial direction d in sequence.

Flow F26: Installing the second inner case 24 into the second outer shell 20 along the axial direction d.

Flow F27: Making the first body 1 and the second body 2 be connected to each other so that the second inner case 24 and the second base 15 are spaced apart from each other to form a disc space 122 of the diversion channel 12. Wherein, the air inlet 200 is communicated with the disc space 122. Wherein, the air inlet 200, the diversion channel 12, and the air outlet 100 are in fluid communication to each other, and the diversion channel 12 is located between the air inlet 200 and the air outlet 100.

In summary, in the present disclosure, the piston is driven to move by the induction coil surrounding the accommodating piece, so that the filler may be atomized by stably passing through the atomizing piece. In other words, the entire atomizing process is controlled by stable and fine electricity, so the size thereof is uniform and the concentration thereof is stable. That is, the present disclosure realizes an atomizing device that can generate smoke of stable size and stable concentration.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. An atomizing device, comprising:

an atomizing component comprising:

an atomizing piece:

an accommodating piece disposed on the atomizing piece, wherein the accommodating piece is in fluid communication with the atomizing piece, and the accommodating piece is configured to store a filler;

a piston disposed in the accommodating piece, wherein the piston has a magnet inside;

an induction coil surrounding the accommodating piece, wherein the induction coil is configured to drive the piston to move toward the atomizing piece;

a transmission wire, wherein one end of the transmission wire is electrically connected to the atomizing piece;

a first electrical connector, wherein the first electrical connector is electrically connected to the other end of the transmission wire; and a second electrical connector disposed on one side of the induction coil, wherein the second electrical connector is electrically connected to the induction coil;

a controlling component disposed on one side of the atomizing component, wherein the controlling component is electrically connected to the atomizing component; and a battery component disposed on one side of the controlling component away from the atomizing component, wherein the battery component is electrically connected to the controlling component.

2. The atomizing device of claim 1, wherein the atomizing piece has a plurality of atomizing holes on the surface of the atomizing piece, and the accommodating piece is in fluid communication with the plurality of atomizing holes.

3. The atomizing device of claim 2, wherein the diameter of the plurality of atomizing holes is within 1 um to 5 um.

4. The atomizing device of claim 1, wherein the atomizing component further comprises a pressure sensor, the pressure sensor is disposed in the accommodating piece, and the pressure sensor is electrically connected to the controlling component.

5. The atomizing device of claim 1, wherein the atomizing component further comprises a heater, and the heater is disposed on one side of the atomizing piece.

6. The atomizing device of claim 1, wherein an outer wall of the piston is disposed with a plurality of limiting protrusions, and the plurality of limiting protrusions is in contact with an inner surface of the accommodating piece.

7. The atomizing device of claim 1, wherein a filling port is disposed on the accommodating piece, and silicone is disposed on the filling port.

8. The atomizing device of claim 1, wherein the atomizing piece is a piezoelectric ceramic.

9. The atomizing device of claim 1, wherein the piston is formed by coating a permanent magnet with silicone.

10. The atomizing device of claim 8, wherein the atomizing piece further includes at least one gas-permeable film, the at least one gas-permeable film disposed on one side of the piezoelectric ceramic away from the accommodating piece.

11. The atomizing device of claim 10, wherein the at least one gas-permeable film has a plurality of holes smaller in size than the holes of the piezoelectric ceramic.

12. The atomizing device of claim 1, wherein a U-shaped groove is disposed on one side of the atomizing piece, and the transmission wire is crimped on the U-shaped groove to be electrically connected to the atomizing piece.

13. The atomizing device of claim 6, wherein an inner wall of the accommodating piece away from the atomizing piece is disposed with a plurality of limiting grooves, and the plurality of limiting grooves correspond to the plurality of limiting protrusions.

14. The atomizing device of claim 1, wherein the first electrical connector includes a conductive sheet and a first conductive pillar, the conductive sheet is electrically connected to the transmission wire, and the first conductive pillar is disposed on one side of the conductive sheet.

15. The atomizing device of claim 14, wherein the first conductive pillar includes a mating terminal end and a connecting terminal end, and the mating terminal end connects to the connecting terminal end; wherein a cross-sectional area of the mating terminal end in a radial direction is larger than the cross-sectional area of the connecting terminal end in the radial direction.

16. The atomizing device of claim 1, the second electrical connector includes a conductive piece and a second conductive pillar, and wherein the conductive piece electrically connects to the conduction coil.

17. The atomizing device of claim 1, wherein the atomizing component further comprises a plurality of pressure sensors respectively disposed at different positions in the accommodation piece, and the plurality of pressure sensors are connected to the controlling component.

* * * * *